(12) United States Patent
Neale et al.

(10) Patent No.: US 6,829,349 B1
(45) Date of Patent: Dec. 7, 2004

(54) SYSTEM AND METHOD FOR MONITORING AND ROUTING INCOMING CALLS

(75) Inventors: Jay Neale, Afton, VA (US); John Baird, Charlottesville, VA (US); Michael Berrang, Waynesboro, VA (US); John Jones, Charlottesville, VA (US); Mark Phillips, Charlottesville, VA (US)

(73) Assignee: Comdial Corporation, Charlottesville, VA (US)

( * ) Notice: Subject to any disclaimer, the term of this patent is extended or adjusted under 35 U.S.C. 154(b) by 634 days.

(21) Appl. No.: 09/630,347

(22) Filed: Jul. 31, 2000

(51) Int. Cl.[7] .................................................. H04M 3/00
(52) U.S. Cl. ......................... 379/265.09; 379/211.02; 379/212.01; 379/265.01; 379/265.02
(58) Field of Search ........................ 379/29.09, 88.19, 379/88.21, 121.04, 121.05, 142.04, 142.06, 265.01, 265.02, 265.09

(56) References Cited

U.S. PATENT DOCUMENTS

| | | | | |
|---|---|---|---|---|
| 5,684,870 A | * | 11/1997 | Maloney et al. | 379/212.01 |
| 5,884,032 A | * | 3/1999 | Bateman et al. | 709/204 |
| 6,052,372 A | * | 4/2000 | Gittins et al. | 370/396 |
| 6,480,600 B1 | * | 11/2002 | Neyman et al. | 379/265.09 |
| 6,611,590 B1 | * | 8/2003 | Lu et al. | 379/265.09 |

* cited by examiner

Primary Examiner—Bing Q. Bui
(74) Attorney, Agent, or Firm—Holland & Knight LLP

(57) ABSTRACT

A system and method is provided for monitoring and routing incoming communications to an agent in an organization. In accordance with the system and method of the invention, a communication control system is provided that includes a server side and a client side. The server side includes a computer telephone integration (CTI) server. The CTI server is connected to a phone switch via an interface application, and includes a call routing server. The communication control system also includes a client side. The client side may include an agent application, an attendant application, and a configuration application. The call routing server monitors all calls coming into an organization which are to an agent or an attendant and routes the calls based on various parameters. The call routing server provides various information to the agent application and the attendant application based on the incoming call.

22 Claims, 21 Drawing Sheets

Real Estate Attendant Screen (All Phones)

Real Estate Attendant Screen (Associates)

Attendant Screen "Associate Editor"

Attendant Screen - Agent "Forwarding Number"

Attendant Screen - "Accessing the Client List"

Attendant Screen - Client Main Screen

Attendant Screen - "View Client Data"

Agent Screen - Client List Editor

Agent Screen - Set Forwarding Numbers

Agent Screen - Screen List

Agent Screen - Client Main Screen   1900

Agent Screen - Client Add/Edit

2100

Agent Screen - Delete Client Confirmation

SYSTEM AND METHOD FOR MONITORING AND ROUTING INCOMING CALLS

BACKGROUND OF THE INVENTION

1. Field of the Invention

The present invention relates broadly to systems and methods for monitoring and routing communications including telephone calls from an individual to an organization.

2. Background of the Invention

As is known in the art, the identity of a caller, for example, may be determined using various methods. An organization benefits by having access to information regarding an incoming caller. In particular, an organization may handle calls more quickly if that organization is aware of the name and background of the calling individual.

Illustratively, a mail order company may have two groups of specialized agents. A first group of agents may be specially trained to handle new customers. A second group of agents may be specially trained to place orders for existing customers, but not to input new customer information. As a result, it is helpful if the mail order company can identify a new customer which they do not have in their database, as opposed to an existing customer, which they do have in their database. With this identification, the incoming call may be more effectively placed to the appropriate group of agents.

As is known in the art, there are various ways of obtaining the telephone number of an incoming caller. One method is to obtain the telephone number of the caller from the telephone carrier. Alternatively, subsequent to accessing the telephone system of the organization, a message, which is played to the caller may request that the caller physically enter their telephone number.

SUMMARY OF THE INVENTION

However, one deficiency of known systems is that such systems do not effectively and efficiently monitor and control an incoming call, while also effectively and efficiently forwarding useful information regarding the incoming call to the appropriate person in an organization. Additionally, the existing systems do not allow various persons working in various departments in an organization to have appropriate access to the system of the organization. In particular, effective access to change parameters in the system of the organization is not provided in known systems. Accordingly, what is needed is a system and method for effectively monitoring and controlling incoming communications, including telephone calls, and providing information regarding such incoming calls.

As used herein, an "organization" includes a company, office, firm, hospital or any other collective group of persons, enterprise or collective entity. Further, an "individual" may be any type of a client, customer, patient, consumer, buyer or any other person. Further, it should be recognized that the terms "office" and "organization" have been used herein interchangeably. In an organization, the persons who interact with the system of the invention are characterized as either an "attendant" or an "agent." The term "associate" has been used herein to describe the collection of agents and attendants.

Accordingly, the system and method of the invention provide an effective and efficient approach for monitoring and controlling telephone calls placed by a caller and received by an organization. In accordance with the system and method of the invention, a communication control system is provided that includes a server side and a client side. The server side includes a computer telephone integration (CTI) server. The CTI server is connected to a phone switch via an interface application. The CTI server includes a call routing server, a digital voice announcer (DVA), a call monitor portion for logging call traffic from the telephone switch, an auto-attendant/voice mail portion, as well as other components. The CTI server also includes a memory, i.e., a central database.

The communication control system also includes a client side. The client side may include an agent application, an attendant application, and a web browser to access a configuration application. The agent application is used by an agent user. The attendant application is used by an attendant user. Further, the configuration application is utilized by an installer, supervisor or other similar type administrative type person in the organization.

The call routing server monitors all calls coming into an organization which are to an agent or an attendant. That is, calls to an agent may come in to the agent's personal Direct Inward Dial (DID) number. Alternatively, a call to an attendant may result from a client calling a general number of the organization. One or more attendants using an attendant application monitor incoming calls as needed. Upon answering the incoming calls the attendant may add useful information to the incoming call and/or direct the incoming call to the appropriate agent or other support staff as required. Additionally, the attendants may add useful information, acquired from a call, to a suitable database.

In accordance with one aspect of the system and method of the invention, a call routing server monitors and generates information regarding incoming calls to an associate. Specifically, the call routing server, if possible, assigns a client number to the incoming call to the agent based on the caller identification (CID) of the incoming call. The call routing server also logs the call in a database. The calls to an agent's DID number or calls that are transferred from another associate are initially presented to an agent's desk phone as a result of the call routed by a switch. That is, the calls are directed to the agent's desk phone. Thereafter, the call routing server may deflect the call to voicemail or to an outside forwarding number based on the preferences of the agent.

An attendant, using an attendant application, processes an incoming call when necessary to appropriately route the call to an agent and add additional information to the call. Specifically, the attendant assigns client information to a telephone call, for example, when a caller ID number for that call is not in the database. Alternatively, the attendant assigns client information to calls that originate from shared numbers. The attendant may also alter the routing status of any of the agents. The attendant may add an additional call tag field to the call. The call tag field provides additional information, which is recorded in the database and then follows the call through the system.

The system and method of the invention utilize a relational database. The relational database contains data regarding clients and agents, including relationships between clients and agents. The system also includes a supervisor's configuration application. The supervisor's configuration application and the associate applications each are provided with the ability to manage the relational database. Illustratively, the supervisor's application may be a web based application, thus providing accessibility from any personal computer (PC) within the organization.

In accordance with the invention, direct inward dialing (DID) lines can be assigned to agents, property listings or tied to advertising, for example. The DID lines tied to advertising may be utilized to gage interest from customers in response to specific advertising, for example. The calls made to a listing number, i.e., a DID number, may result in the call being routed to a designated agent. Further, all lines and DID numbers may have an extended greeting field with information about the listing or a greeting message to be spoken by the associate answering the call. Each greeting message has an associated label used when reports are generated that document the call activity.

The system and method of the invention may be utilized with or without persons being present in the organization or office. Specifically, the call routing server is intended to run constantly logging information, screening and routing calls as the calls come into the organization. Additionally, an auto-attendant may be utilized to handle calls as needed when no human attendants are logged into the system. Both the call routing server and the auto attendant may reside on a computer telephone integration (CTI) server.

The system and method of the invention, and specifically the call routing server, is used to effectively match a client ID number with an incoming call as the associate receives the call. Once a client ID number is matched with the incoming call, the call routing server then uses this client ID number to retrieve information regarding that client from the database. This client information is then conveyed to the appropriate associate utilizing the agent or attendant application. For example, a screen pop or other dialogue may appear on the appropriate associate's computer screen. As a result, the associate immediately possesses information regarding the incoming call, prior to initiating conversation with the caller in an effective and efficient manner.

BRIEF DESCRIPTION OF THE DRAWINGS

These and other aspects of the invention will become apparent from the following descriptions which illustrate exemplary embodiments of the invention when read in conjunction with the accompanying drawings, in which.

DETAILED DESCRIPTION OF THE PREFERRED EMBODIMENTS

Figure 1:
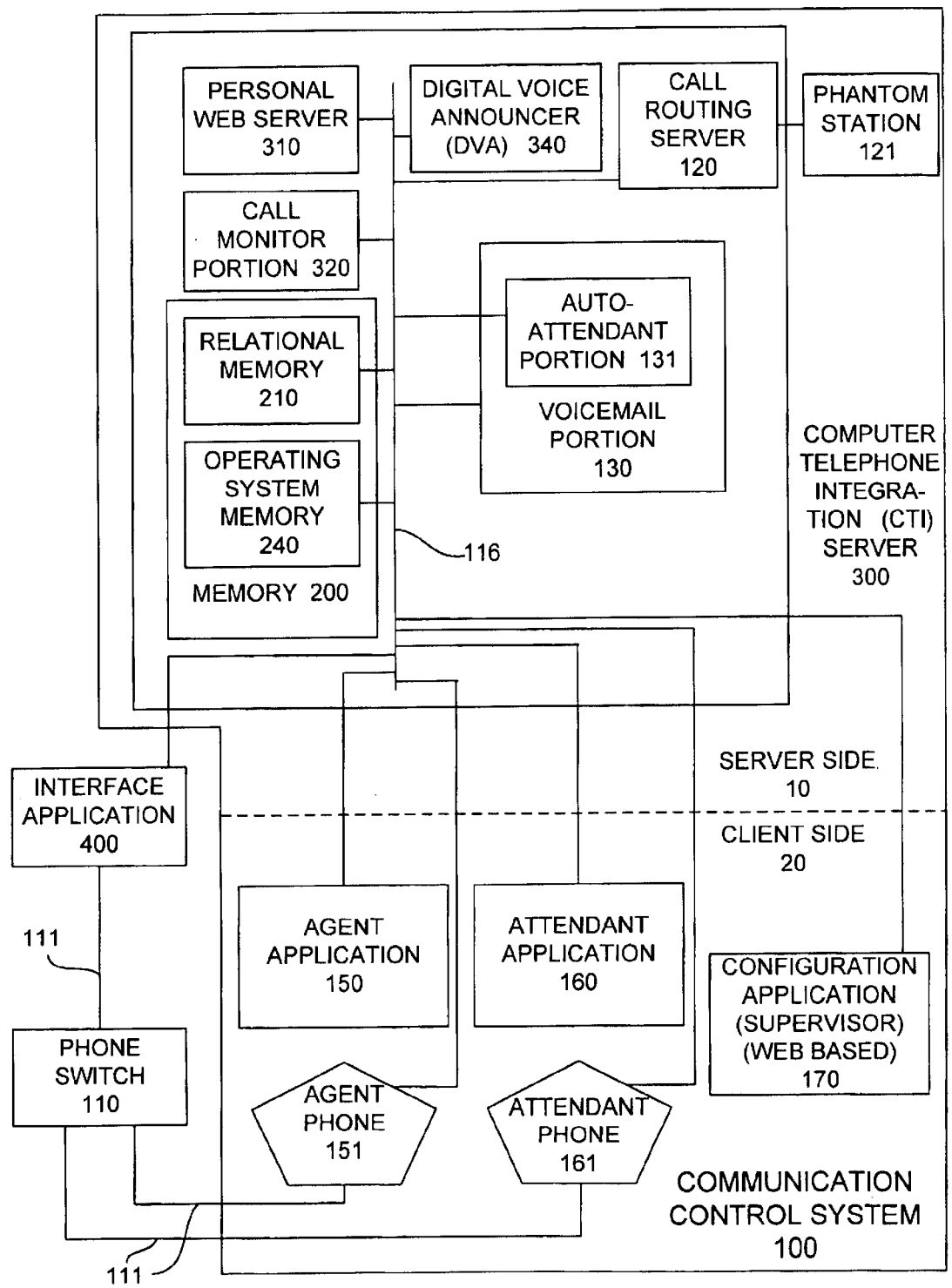
FIG. 1 is a block diagram showing a communication control system in accordance with an embodiment of the system and method of the invention.

With reference to the accompanying drawings wherein like numerical identifiers have been used to represent like features, FIG. 1 is a block diagram showing an embodiment of a communication control system 100 in accordance with the system and method of the invention. As illustrated in FIG. 1, the communication control system 100 includes a server side 10 and a client side 20. The server side 10 includes a computer telephone integration (CTI) server 300. The CTI server 300 is connected to an interface application 400 via an interface 116. The interface application 400 is connected to a phone switch 110 by links 111. The interface application 400 provides various functionality, as described below. The phone switch 110 is also connected to each of an agent phone 151 and an attendant phone 161 by further links 111.

The CTI server 300 includes a call routing server 120. Additionally, the CTI server 300 includes a personal web server 310 a call monitor portion 320 and a digital voice announcer (DVA) 340. Also, the CTI server 300 includes a voicemail portion 130, which includes an auto-attendant portion 131. Also, the CTI server 300 includes a memory 200. The memory 200 includes a relational memory 210 and an operating system memory 240. As shown in FIG. 1, a phantom station is connected to the call routing server 120. However, the phantom station 121 does not reside on the CTI server 300.

The communication control system 100 also includes a client side 20. The client side 20 includes an agent application 150 and an agent telephone 151; an attendant application 160 and an attendant telephone 161; and a configuration application 170.

The agent application 150 may reside on an agent's personal computer (PC), for example. A human agent interacts with the agent application 150 to perform various operations in accordance with the system and method of the invention. The agent also interfaces with the agent telephone 151. The agent's telephone 151 may be in the form of a typical telephone. It should be appreciated that the agent telephone 151 and the agent application 150 independently interact with the CTI server 300 in accordance with the invention.

The attendant application 160 may reside on an attendant's PC, for example. The attendant, i.e., an attendant user, interacts with the attendant application 160 to perform various operations in accordance with the invention. The attendant user also interacts with the attendant telephone 161. The attendant's telephone may also be a typical telephone. However, it should be appreciated that the attendant application 160 and the attendant telephone 161 independently interact with the CTI server 300 in accordance with the invention. Illustratively, the attendant application may reside on the PC of a receptionist at the front desk of an organization, for example. i.e., the attendant may be a receptionist.

The configuration application 170 may also reside on a PC. Illustratively, the configuration application 170 might reside on the PC of a supervisor of an office. The configuration application 170 may be accessed by any suitable remote communications medium such as a web based application, or any other suitable communications medium. The personal web server 310 in the CTI server 300 supports the configuration application 170. Illustratively, the configuration application 170 may utilize password protection. The configuration application 170 provides a supervisor user with the ability to generate reports, set up and modify agent information, assign passwords or set user limits, for example. Accordingly, the configuration application 170 allows a supervisor type person to access a variety of data in the relational memory 210.

As described above, the call monitor portion 320 also resides on the CTI server 310. In accordance with the system and method of the invention, the call monitor portion 320 monitors both incoming and outgoing calls for billing purposes.

As shown in FIG. 1, the communication control system 100 is in the form of a specific operating system. However, it should be appreciated that the communication control system 100 may be implemented on any of a variety of operating systems. Further, the memory 200 may be in the form of a hard drive, a floppy drive or any other of a wide variety of memory devices and file systems. In accordance with the invention, the memory 200 resides on the CTI server 300 so as to be accessible to all applications including the agent application 150, the attendant application 160 and configuration application 170.

As shown in FIG. 1, the communication control system 100 includes an interface 16. The interface 116 may be any appropriate data line or data connection allowing communication between the various components of the communicating control system 100, as described below.

Also, it should be appreciated by those skilled in the art that the system and method of the present invention may be utilized in a wide variety of operating environments. Illustratively, as described below, the system and method of the invention may be utilized in the environment of a real estate office or firm. However, it should be appreciated that utilization within the environment of a real estate office is merely exemplary and not limiting. The system and method of the invention may be used in any of a wide variety of other applications including, but not limited to, sales environments such as retail sales or car sales, travel agencies, or hospitals, for example. In general, the system and method of the invention are applicable to any enterprise utilizing a mobile sales force.

As shown in FIG. 1, the memory 200 in the CTI server 300 includes a relational memory 210 and an operating system memory 240. The relational memory 210 contains various information regarding clients. For example, the relational memory 210 provides information in response to an input caller ID, agent preferences, and various other information. The relational memory 210 may be at least in part in the form of lookup tables, for example. Additionally, the memory 200 includes the operating system memory 240. The operating system memory 240 contains the necessary information to operate the communication control system 100, including executable programs and code, for example.

Figure 2:
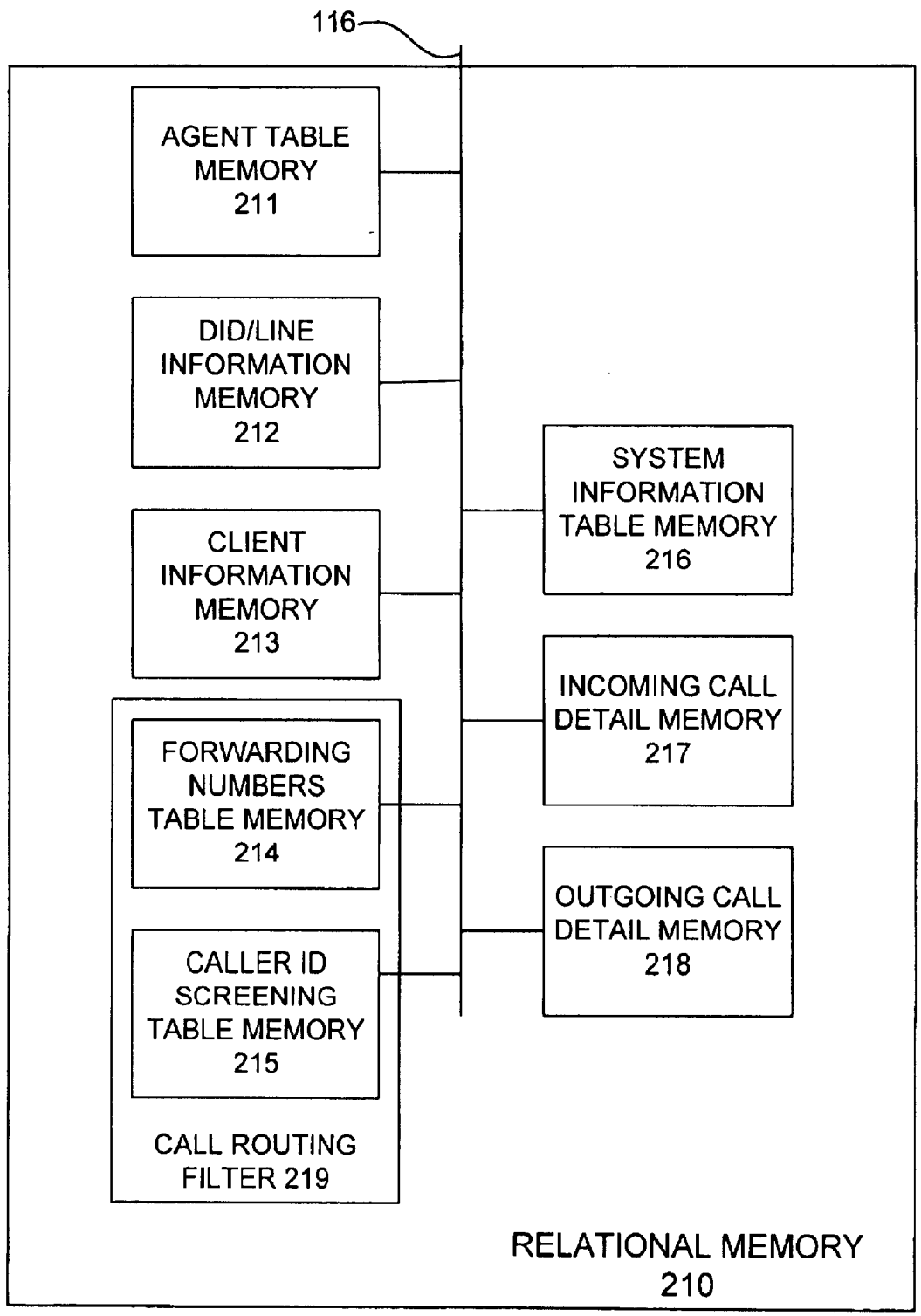
FIG. 2 is a block diagram showing in further detail the relational memory of FIG. 1 in accordance with an embodiment of the system and method of the invention.

FIG. 2 is a block diagram showing in further detail the relational memory 210 as shown in FIG. 1. As shown in FIG. 2, the relational memory 210 includes an agent table memory 211, a DID/line information memory 212, a client information memory 213, a forwarding numbers table memory 214, a caller ID screening table memory 215, a system information table memory 216, an incoming call detail memory 217, and an outgoing call detail memory 218. The relational memory 210, in general, holds a variety of information for use in conjunction with the operation of the communication control system 100. Illustratively, the relational memory 210 holds information including agent information, DID/line information, client information and incoming call detail information. Further, the relational memory 210 stores the information for establishing the relationship between agents and clients permitted to contact the agent when screening is enabled. The forwarding numbers table memory 214 and the caller ID screening table memory 215 may be characterized as forming a routing filter 219, as shown in FIG. 2 and as described below.

Each of the memories contained in the relational memory 210 are utilized by the communication control system 100 for respective purposes, described in detail below. Illustratively in summary the agent table memory 211 contains information regarding the agents in the organization. The DID/line information memory 212 contains greeting information generated in response to calls on respective DID lines. The client information memory 213 contains a variety of information regarding clients. The forwarding numbers table 214 contains information regarding the forwarding number or numbers, which may be specified for each agent. The caller ID screening table memory 215 contains information regarding the screening of calls. The system information table memory 216 contains information regarding database revisions and call forward time, for example. The incoming call detail memory 217 contains information regarding incoming calls. The outgoing call detail memory 218 contains information regarding outgoing calls from the organization.

As described above, the communication control system 100 includes a server side and a client side 20. As shown in FIG. 1, the client side 20 includes one agent application and one attendant application 160. However, the communication control system 100 may include as many agent applications and attendant applications as is necessary or desirable, limited only by the amount of support resources residing on the CTI server 300. Illustratively, in an organization there may be fifty agent applications and two attendant applications. The CTI server 300 may be operated 24 hours a day 7 days a week.

The call routing server 120 monitors incoming calls to attendants and agents and routes calls externally of the communication control system 100 if necessary. The routing of calls performed by the call routing server 120 is performed based on settings in the relational memory 210. The settings are established by agents and the agent's preferences.

As described above, the agent application 150 is utilized by agents in conjunction with answering the agent telephone 151. In contrast and as described above, the attendant application 160 may be utilized by persons, i.e., attendants, at the front desk of an organization. The attendant application 160 is used to monitor calls coming in on the general number of an organization, for example. Using the attendant application 160, the attendants have the ability to graphically view the state of all the calls, monitor phones in the office, and transfer calls, for example. Each attendant application 160 also has the ability to set up an agent's in or out of office status or where the agents desire their calls to be routed.

The communication control system 100 may be utilized in conjunction with two types of clients, for example. These two types of clients include corporate clients and agent clients. Corporate clients are effectively shared clients among the agents in the office. These corporate clients are essentially a type of "company resource." Accordingly, the attendant application 160 or the configuration application 170, as well as an agent application 150, can change parameters associated with a corporate client. These parameters are stored in the relational memory 210.

On the other hand, an agent's client can only be seen by the agent's application. The agent's client is not shared. However, the CTI server 300 does provide the agent application with the ability to transfer agent clients to another agent.

It should be appreciated that the agent application may be utilized by an agent to set up various preferences regarding various parameters, such as routing of calls, for example, as described in further detail below. However, while the agent application 150 sets these preferences for an agent, the agent application 150 itself does not perform the routing of calls. Rather, the call routing server 120 actually performs the routing of calls based on the agent's preferences.

Illustratively, a call comes into the communication control system 100 to the agent's telephone 151. The agent may have set their preferences to have their calls follow the agent out of the office. Accordingly, if a call comes to the agent telephone 151, the call routing server 120 monitors that call and deflects it to a desired telephone number, based on the preference set by the agent application. That is, the call routing server 120 sees the call coming into the agent's telephone 151 and deflects that call to another number. As a result, it should be appreciated that the agent's application 150 does not have to be on, i.e., running, for the calls to be routed by the call routing server 120, since the call routing server 120 is running constantly.

Once a call comes into the communication control system 100 to an agent or an attendant, the call is then monitored by the call routing server 120. The call routing server 120 logs all incoming calls to either agents or attendants and stores this information in the memory 200, and specifically in the incoming call detail memory 217. Additionally, in accordance with one embodiment of the invention, the call routing server 120 determines, upon monitoring an incoming call, whether an agent has selected to screen that agent's calls. If screening is turned on for a particular agent, the call routing server 120 determines whether to let the call through to the agent. Further, if an agent has selected a "follow me" feature, then the call routing server 120 deflects the call to a specified number, which may be an external number. Accordingly, all calls to associates, including agents and attendants, are monitored by the call routing server 120. In contrast, incoming calls directed to support staff, for example, may not be monitored by the call routing server 120.

As described above, the call routing server 120 monitors, i.e., watches, all activity of associate's phones, including calls presented to these phones. However, it should be appreciated that where calls are directed, as they come into the organization, is a functionality of the phone switch programming. Thus, a telephone call to the general number of a company might logically be directed to an attendant telephone 161. In contrast, an incoming telephone call to a DID number might logically be directed to the agent assigned that DID number. However, it should be appreciated that a call might come in to the general number, be answered by an attendant using the attendant application 160, and thereafter be transferred to an agent. This situation might develop where a client has forgotten the particular agent's DID number and looked up the firm's general number in the yellow pages.

When the call is transferred to the agent by the attendant, it is just like a call from the outside coming to the agent on the agent's DID line. The call routing server 120, watching the agent's phone, sees the transferred call, and the call routing server 120 goes through its various operations. The call routing server 120 deals with the transferred call as if it had come in directly from the client. Illustratively, the call routing server 120 determines if it lets the call go through screening, or whether to route the call. Accordingly, a transferred call is effectively just like a call coming in on the DID line of the agent. Further, it should be appreciated that the attendant does not need to be aware of whether the agent is or is not available to take the call. That is, once the attendant transfers the call to the attendant's DID line, that call will then be monitored by the call routing server 120. Additionally, it should be noted as described above that the system does not require the agent's application to be running for calls to be routed. For that matter an agent without a PC could take advantage of call routing by having an attendant set their parameters for them.

In accordance with the invention as described above, a call may come into an agent telephone 151 and be "deflected" or "rerouted" by the call routing server 120. Such rerouting of an incoming call is performed by the call routing server 120, working in conjunction with a phantom station 121 and the digital voice announcer (DVA) 340. Illustratively, an agent may 2F have activated the call forwarding or "follow me" feature. As a result, the call routing server 120 initially deflects this incoming call, which came to the agent's telephone, to the digital voice announcer 340. The digital voice announcer 340 may be in the form of a board, which resides in the CTI server 300, possessing a plurality of ports that behave as standard telephones. The call routing server 120 deflects the call to one of these ports in the digital voice announcer 340. The digital voice announcer 340 then plays an appropriate message to the caller. That is, the port in the DVA 340 answers the call and plays a message to the caller. The digital voice announcer 340 may play a message such as "please wait while we contact Dan" and thereafter may, depending on routing parameters, play any suitable message such as a song. In operation, the DVA 340 may utilize resources in the voice-mail portion 130, such as recorded messages in the voice-mail portion 130.

At the same time that the digital voice announcer 340 is playing the message to the caller, the phantom station 121 is also operating. A phantom station is a port on a digital phone board. The phantom station 121 acts like a phone with respect to the phone switch 110, but does not physically exist as a phone. That is, the phantom station 121 does not posses any hardware such as a touch pad and headset or interface network. Thus, the phantom station 121 substitutes for a phone and operates in every way like a phone, except it does not have the human interface features.

Simultaneously with the operation of the digital voice announcer 340, the call routing server 120 requests and utilizes one of the phantom stations 121. Essentially, the call routing server 120 has a pool of phantom stations 121 to utilize. The phantom station 121 selected is then a party to the call for the duration of the call. The phantom station 121 makes the call to the agent at an external number determined by the routing parameters of the agent. As soon as the phantom station 121 makes the call to the agent, the phantom station 121 then puts the call on hold. That is, while the call is ringing, the phantom station 121 puts the call on hold. If "call retrieval" is set as a routing parameter for the agent and the agent does not answer the call in a set period of time the DVA 340 routes the call to the agent's voicemail in the voicemail portion 130 and the call made to the agent by the phantom station 121 is disconnected. If call retrieval is set as a routing parameter for the agent and the agent answers the call, the call from the agent is put on hold. When the phantom station 121 places the call on hold it provides a signal to the DVA 340 indicating that the phantom station 121 is prepared to take the call back from the DVA 340. The DVA 340 then transfers the call to the phantom station 121. As soon as the phantom station 121 has the call from the DVA 340, the phantom station 121 conferences the call which it had previously put on hold to the agent. Thereafter, for the duration of the call, the phantom station 121 holds a "conference" between the agent and the original caller, i.e., the phantom station 121 holds a conference between the person calling and the agent out in the field. Accordingly, effective routing of the call by the call routing server 120 is performed.

While the method described above for routing employs a phantom station to hold a conference for the duration of the routed call, alternatively, other methods could be employed. For example a trunk-to-trunk transfer could be established at the point where the conference would be made if the switch 110 has the capability to perform this act. Another example would employ a central office where the switch trunks originate, to facilitate the transfer. This requires that the central office can provide such a feature and the switch has the capacity to request the feature. However it is beneficial to employ such a measure if possible since it frees up the lines required for the inbound and outbound call.

In accordance with the system and method of the invention, further aspects of the communication control system 100 will hereinafter be described. When a call comes into the organization, the call routing server 120 attempts to match a caller ID of the incoming call to a "primary" number stored in the client information memory 213. Further, the call routing server 120 logs incoming calls in the incoming call detail memory 217. The call routing server 120 routes calls based on the individual preferences of an agent using the forwarding numbers table memory 214 and the caller ID screening table memory 215, for example. However, the call routing server 120 may be unable to match the incoming caller ID with a caller ID in the memory 200. For example, the incoming call may be from a new client who has not before contacted the organization. For example, an incoming call may be to a general number, i.e., one of the attendant's phones. Upon receipt of the incoming call, an attendant at an attendant application 160 processes the incoming call as described below.

Once the call routing server 120 logs a call in the incoming call detail memory 217, each of the calls may be accessed to provide reports of all the inbound calls. Thereafter, the call routing server 120 performs a process which may be characterized as a client ID assignment. Specifically, calls with a caller ID registered in the client information memory 213 are assigned, i.e., matched with, a "primary caller ID number." The matched primary caller ID number is associated, i.e. matched, with a "client ID number." The client ID number is associated with the client information in the client information memory 213. It should be appreciated that clients commonly move and/or switch numbers. By assigning a client a permanent client ID number, the primary caller ID number may be easily changed. Thus, a new primary caller ID number may be associated with the permanent client ID number. Accordingly, the client number may be used to provide appropriate information at the agent's desktop. Illustratively, this information may be shown in the form of screen pops at the agent's desktop. These screen pops are venerated by the call routing server 120, which monitors incoming calls to agents and attendants as described above.

Additionally, the call routing server 120 may perform a screening process on the incoming call using screening filters. In accordance with an embodiment of the invention, the screening filters may be stored in the caller ID screening table memory 215 in the relational memory 210. The call routing server 120 uses the screening filters to filter out caller IDs not in the agent's forwarding list. As a result, calls not in the forwarding list are forwarded to the agent's voicemail box in the voicemail portion 130.

Additionally, the call routing server 120 performs a routing process on incoming calls based on the agent's preferences as discussed above. That is, when the agent is out of the office, incoming calls may be routed to a pre-selected number or numbers stored in the forwarding numbers table memory 214. For example, the call may be routed to one of the three numbers in turn. This routing process will be described in further detail below.

As described above, the CTI server 300 is connected to the phone switch 110 via an interface application 400. Illustratively, the interface application 400 may be a commercially available product. WIDEOPEN.OFFICE. The interface application 400 is essentially a service provider for the telephony applications in the CTI server 300. The interface application 400 handles the communication link to the telephone switch, and expresses telephone calls to telephony applications in the CTI server 300, this may be performed using computer supported telephony application (CSTA) format, for example. CSTA is a standard interface between a network server and a telephone switch (PBX). Additional commands specific to any unique or customized switches are facilitated as well. The interface application 400 also facilitates inter-application communication functions. This allows messages to be passed from one application in the communication control system 100 to another or broadcast from one application to all applications. Finally, with the use of a purchased software protection key, the interface application 400 administrates the login of the agent, attendant and configuration applications (150, 160, 170).

As described herein, the DVA 130 provides a voice supply. The voice supply is able to play wave files containing names of people that have been recorded, for example. To obtain the wave file corresponding to a person's name, the DVA identifies the directory that the file resides based on the caller ID of the person. With respect to the initial storage of these files that are retrieved by the DVA 130, using the extension corresponding to the person, the wave file originally is named NM00xxxx.NAM, for example, where xxxx is the extension. For example, the wave file corresponding to the name of the person using extension 103 may be stored and found at C:\VM\NM000103.NAM. The DVA 130 retrieves this stored file in operation of the DVA 130, as described herein. However, it should be appreciated that these files may be stored in any suitable manner.

Hereinafter, aspects of the invention will be described in further detail. In accordance with the invention, the attendant application 160 assigns client information to calls for which client ID numbers are not in the client information memory 213. Additionally, the attendant application 160 may assign client information to calls that originate from shared numbers, as described below. The call routing server 120 may present a "dialogue" to the attendant.

As used herein, a "dialogue" may be characterized as a computer generated screen and keyboard-mouse arrangement, or other interface that allows a user to exchange information with the computer. Illustratively, the interface might be a computer generated voice and voice reader, rather than a touch screen.

In generation of a dialogue, the attendant application 160, working with the call routing server 120 may present an attendant user with a greeting specific to an incoming DID line using the DID/line information memory 212. Simultaneously, the attendant application 160 may present the attendant user with the caller ID for the incoming call. For example, the DID line might be indicative of advertising in a certain geographical areas. This information will assist the attendant in handling the call. The call routing server 120 will also attempt to match the incoming call with a primary caller ID number in the client information memory 213. If the incoming caller ID did not match a primary caller ID number in the client information memory 213, then the attendant may create a primary caller ID in the client information memory 213 for a client, as well as a client ID number. Thereafter, that caller ID number will be matched to the primary caller ID number in the client information memory 213.

Further, it should be appreciated that the attendant user may find it necessary or desirable to attach certain information to the incoming call. Illustratively, the attendant user may wish to attach information regarding the content of the attendant user's discussion with the caller. To address this possible requirement, the attendant application 160 may provide an optional call tag field to add additional information to the call. This call tag field will follow the call during processing by the communication control system 100. Once this association, between the call and the attendant user generated call tag, has been made, the call may be directed to the agent responsible for that client. Additionally, the attendant application 160 forwards this information in the form of a record to the incoming call detail memory 217 for recordation.

Alternatively, it should be appreciated that the attendant application 160 may forward the record of the incoming call immediately to the incoming call detail memory 217 for recordation of the incoming call. It should be appreciated that the various data in the relational memory 210 allows operation of a reporting feature of the system. The data in the incoming call detail memory 217 will contain incoming DID line information, caller ID information for the call and primary caller ID information, the agent that the call was routed to and the optional call tag information. This data may be utilized in generating suitable reports.

In accordance with the system and method of the invention as shown in FIG. 1, the CTI server 300 also includes an auto-attendant portion 131. In accordance with the invention, the auto-attendant portion 131 routes calls when no attendant applications are open or when all of the attendant applications are overloaded. The auto-attendant portion 131 provides a caller with a variety of options. The auto-attendant portion 131 allows the caller to select the voicemail of a specific agent. Also, the auto-attendant portion 131 allows a caller to select the option of connecting to the first available agent. Additionally, the auto-attendant portion 131 allows a caller to select an option in which the caller will obtain more general information about the firm. Illustratively, the information may include the hours of operation of the firm, directions or other general information.

As described above, the call tags are created by an attendant user to provide additional information to an agent once the call is forwarded to the agent. The agent application 150 provides an interface for the agent to see these call tags. The agent application 150 also provides a dialogue to modify an agent's call routing filter and schedule. Further, the agent interface portion 152 generates a client assignment dialogue to modify the list of clients for a respective agent. Specifically, the agent may add, edit and delete from the list of clients. These and other features of the invention are described below.

As shown in FIG. 1, the communication control system 100 includes a configuration application 170, which allows the supervisor to revise information in the relational memory 210. In one embodiment, the configuration application 170 may be a web based application. That is, the configuration application 170 may be configured so as to be accessible from any desktop within an office network. Additionally, the configuration application 170 may be provided with password protection so as to allow only the supervisor access. The configuration application 170 provides a supervisor with the ability to generate reports, set up and modify information associated with agents, assign passwords, and set user limits, for example.

Accordingly, the configuration application 170 can generate a variety of reports at the request of a supervisor user.

For example, the configuration application 170 can track call traffic on DID lines to determine interest in listings and effectiveness of advertising. Additionally, the configuration application 170 can track the call volume of agents.

Accordingly, each of the call routing server 120, the DVA portion 340, the agent application 150, and the attendant application 160 cooperate to provide a system in which incoming calls are controlled and routed in an efficient and effective manner. The communication control system 100 provides an effective way for either an attendant, agent or supervisor to adjust the operating parameters of the system including routing parameters and preference parameters, for example. Hereinafter, further aspects of the communication control system 100 will be discussed in terms of the arrangement and operation of the system.

In accordance with the invention, the call routing server 120 performs a client ID matching process. In summary, the client ID matching process includes first determining the caller ID number of an incoming call. Then, the communication control system 100 attempts to match a primary caller ID number in the client information memory 213, with the caller ID number of the incoming call. If a match is found in the client information memory 213, then the incoming caller. ID number is matched to the client ID number, using the primary caller ID number in the client information memory 213.

It should be appreciated that one client may call from a number of locations at different times. However, regardless of the location from which the client calls, it is important that the communication control system 100 have the capability to match a client to their client ID number contained in the client information memory 213. The match allows the communication control system 100 to generate a proper screen pop or other appropriate message, for example, to occur at the agent's desktop. In accordance with the invention, the attendant application 160 is given the primary responsibility of matching clients, which were not identified by the call routing server 120, to the appropriate client ID number. However, while the attendant application 160 has primary responsibility, the agent application 150 also has the ability to match clients which were not automatically identified by the call routing server 120, to an appropriate client ID number.

In accordance with the system and method of the invention, an incoming call comes into the office possessing an incoming caller ID number. In accordance with the invention, there are three basic levels of recognition of the incoming call. The three basic levels of recognition are hereinafter described. Also, the communication control system 100 provides a distinction between "personal numbers" and "friends of the firm", as described below in conjunction with call routing, in particular.

The first basic level of a recognized caller ID is to recognize the incoming call as a client number. For example, five numbers may be associated with a particular client including an office phone, a home phone, and a cell phone, for example. In accordance with the invention, these caller ID numbers are specific to the client, with the exception of a shared number.

The second basic level of recognized caller ID is an incoming call that is a shared number. A shared number may be associated with a number of clients. That is, multiple clients of a real estate agency may all be employed at the same location. However, the location may have only a single caller ID. As a result, regardless of the specific client calling, the caller ID would be the same. To address this possibility, the communication control system 100 generates an appropriate dialogue box to pop on an attendant's or agent's application, for example. This dialogue box will allow the attendant or agent to be informed regarding information about the shared number.

However, it should be appreciated that the incoming call from a shared number may have come in on either a general number of the office or a DID line of a specific agent. If the incoming call came in on the general number, then an attendant would generally intercede to talk with the caller to determine which agent the caller is seeking. However, if the incoming call came in on a DID line, and the DID line is associated with a particular agent, the call routing server 120 will generate a screen pop at that agent's agent application 150 providing information about the shared number.

A third basic level of recognized caller ID is an unrecognized caller ID. When a caller ID cannot be associated with an existing client, the call is marked by the call routing server 120 as an unrecognized call. In response to this type of call, the attendant application 160 may query the caller for the caller's name. Given this information, the attendant application 160 may retrieve any client information that is available in the client information memory 213. This might be performed by searching the client name. Alternatively, an attendant using the attendant application 160 creates a caller ID number and the data fields associated therewith. The attendant application 160 then routes the call to the appropriate agent.

Figure 3:
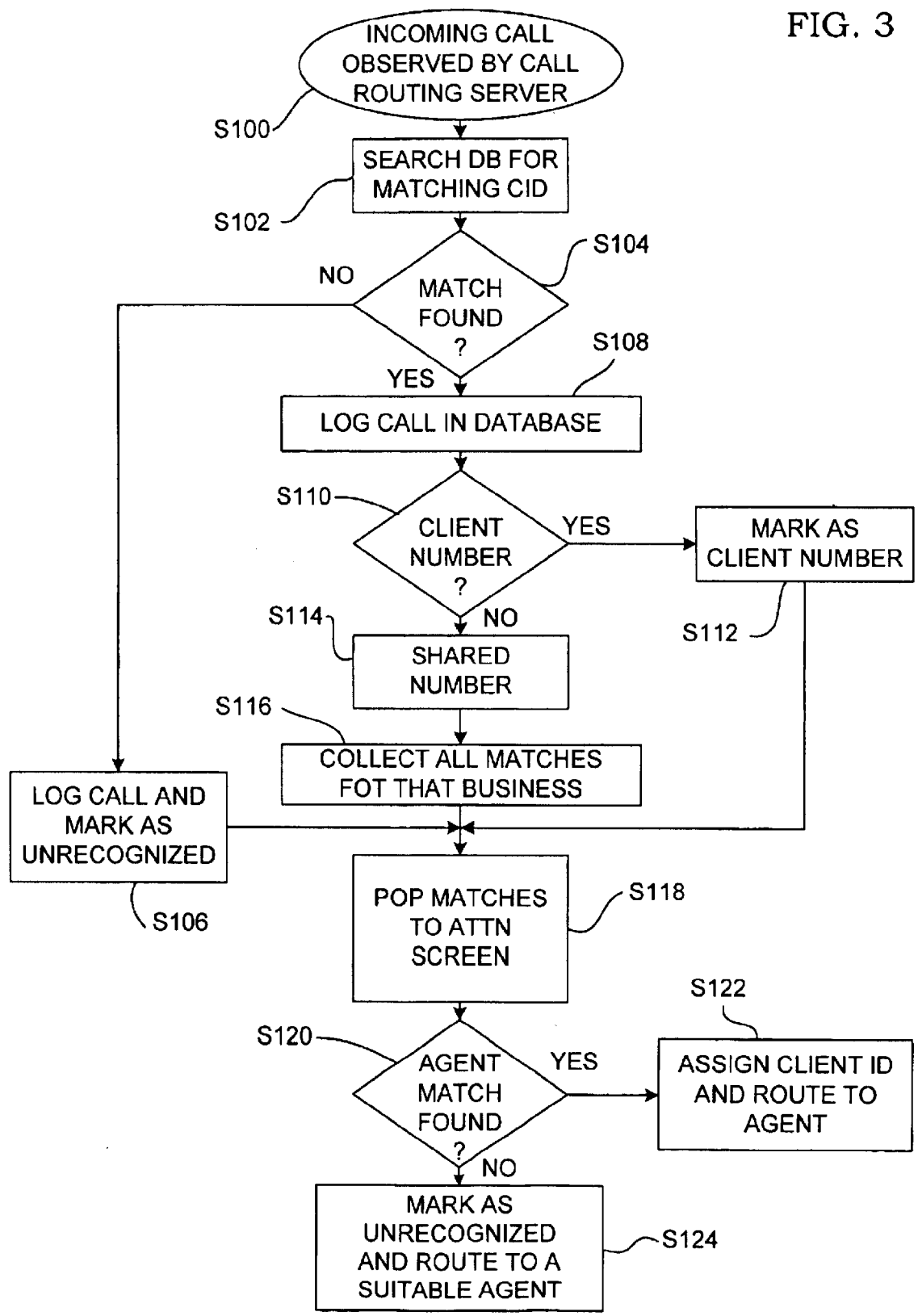
FIG. 3 is a flow chart showing the caller ID/client matching process in accordance with an embodiment of the system and method of the invention.

In accordance with the system and method of the invention, FIG. 3 is a flowchart illustrating a process by which an incoming call is matched with information in the relational memory 210. Specifically, FIG. 3 illustrates a situation where a call has come to an attendant's phone. For example, the call may be to a general number of the office or firm. As shown in FIG. 3, the process starts in step S100. In step S100, an incoming call is observed by the call routing server 120. Then the process passes to step S102. In step S102, the call routing server 120 searches the client information memory 213 for a matching primary caller ID number. Then, the process passes to step S104.

In step S104, the call routing server 120 determines whether a match is found in the database. If a match is not found, then the process passes to step S106. In step S106, the call is logged and marked as unrecognized. After step S106, the process then passes to step S118. Alternatively, if a match is found in step S104, then the process passes to step S108.

In step S108, the call is logged in the incoming call detail memory 217. Then the process passes to step S110. In step S110, the call routing server 120 determines whether the match is a specific client number. If yes, then the call is marked as a client number in step S112. After step S1112, the process passes to step S118.

Alternatively, if in step S110, the call routing server 120 determines that the call is not a specific client number, then the process passes to step S114, in which the call routing server 120 identifies the call as a shared number. After step S114, the process passes to step S116.

In step S116, the call routing server 120 collects all the matches for the business associated with the incoming caller ID number. After step S116, the process passes to step S118.

Accordingly, subsequent to each of steps 106, step S112, and step S116, the process passes to step S1118. In step S1118, the call routing server 120 generates a screen pop that shows all the information available for the incoming call. Generation of the screen pop is performed utilizing the attendant application 160 on the attendant's desktop. It should be appreciated that as a result of the steps performed prior to step S118, the screen pop generated on the attendant's screen, is tailored to both information obtained directly from the incoming call, including the caller ID number if the call came in on a DID line, and data previously stored in the relational memory 210.

Then, the process passes to step S120. In step S120, the attendant application 160 determines whether the client number is associated with a particular agent. If no, then the process passes to step S124. In step S124, the call is marked as unrecognized and routed to a suitable agent. Alternatively, if yes in step S120, i.e., the attendant application 160 finds a match, then the process passes to step S122. In step S122, the client ID is assigned to the matched agent and the call is routed to that agent.

The features of the system and method of the invention will hereinafter be described in further detail. In accordance with the invention, all calls directed to an agent may first be subjected to the routing filter, 219, which includes the forwarding numbers table memory 214 and the caller ID screening table memory 215. The routing filter 219 determines the disposition of the call and may be characterized as a set of preferences of the agent. Thus the relational memory 210 holds the agent preferences and is queried by the call routing server 120.

The parameters of the routing filter 219 may be modified in a variety of ways. For example, the parameters may be modified by an agent using the agent application 150.

Additionally, the parameters may be modified by the attendant application 160 or the supervisor portion 170.

In accordance with the system and method of the invention, the call screening may or may not be enabled. If the call routing server 120 determines that call screening is enabled, the call routing server 120 queries the relational memory 210, and specifically the caller ID screening table memory 215, to determine if the incoming call from the client is permitted by the agent's preferences. If the call routing server 120 determines that the call is permitted, then the call proceeds with the call routing in order to attempt to contact the agent.

The call routing may also include a "do not disturb" feature. The "do not disturb" feature may be enabled using the agent application 150. When the "do not disturb" featured is enabled, then call routing is bypassed. That is, all calls are directed to the voicemail portion 130.

Additionally, the call routing performed by the call routing server 120 may include an "in or out of office" feature, i.e., a "follow me now" feature. This setting determines whether the call will be sent to the office station or transferred to a forwarding number external to the system. That is, when "out of office" is selected, for example, the call routing server 120 will forward the call to a predetermined external number.

Further, the call routing may include a "forwarding number" feature. The forwarding number information is stored in the forwarding numbers table memory 214. Using the "forwarding number" feature, the agent may specify three numbers, for example, for forwarding purposes. In accordance with an embodiment, two of the three numbers are intended to be static and not readily changed. The third number is reserved as a temporary number, and may be easily changed. For example, the temporary number may be changed from a remote location, while a static number cannot. Additionally, using the "forwarding number" feature, the agent may specify the order in which the numbers are forwarded.

Finally, the call routing may include a "retrieval" feature. Using this feature, the agent has the option of having calls, which are routed externally and go unanswered, to be retrieved and sent to the system voicemail. With the retrieval enabled, transfers to an outside number are monitored by the call routing server 120 for call completion. If the call routing server 120 determines that the call is unanswered in a set number of rings, the call is retrieved and routed to the agent voicemail box 130 or some other appropriate voicemail box.

Figure 4:
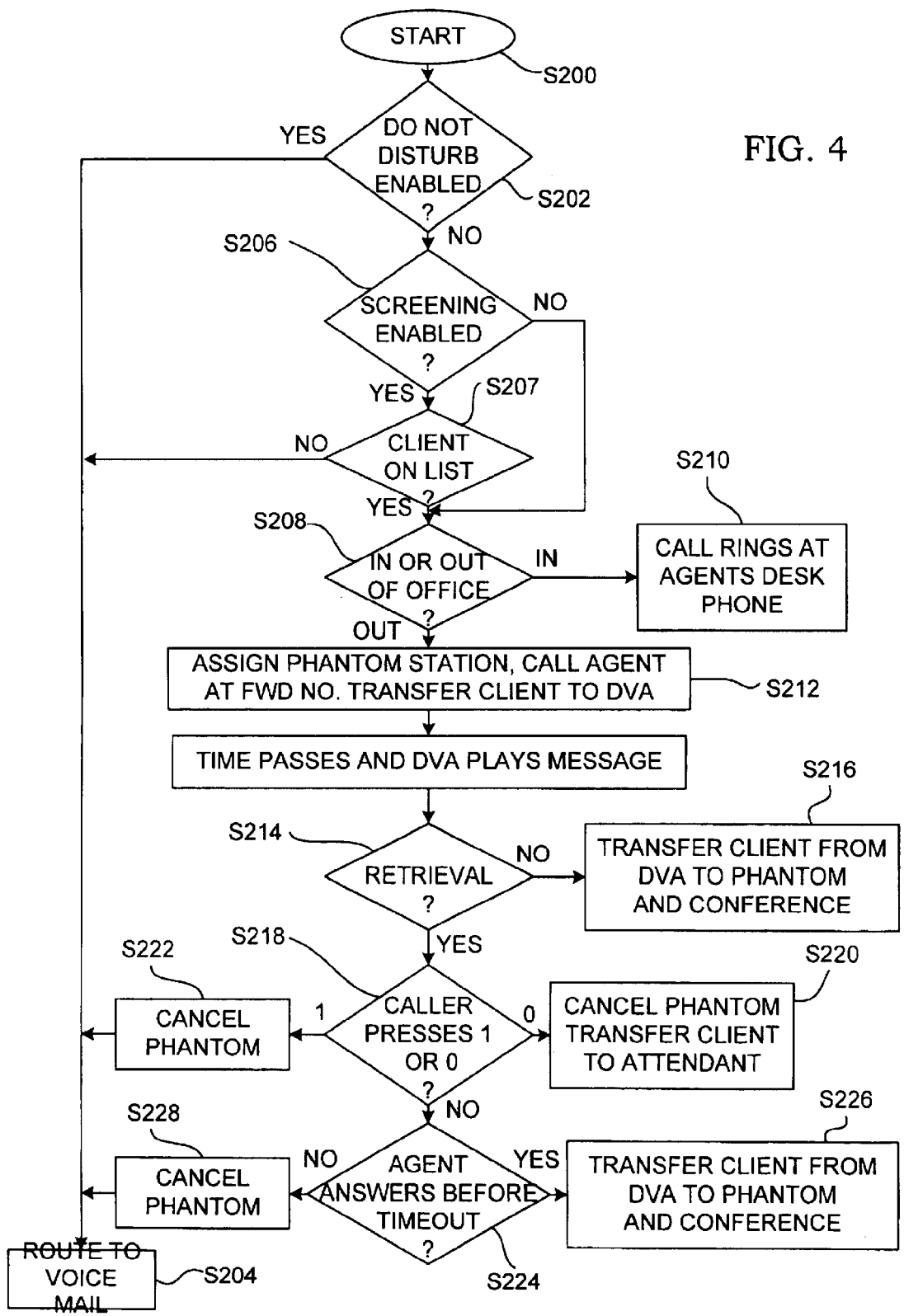
FIG. 4 is a flow chart showing a call routing process in accordance with an embodiment of the system and method of the invention.

FIG. 4 is a flowchart further illustrating the call routine process in accordance with the system and method of the invention. As shown in FIG. 4, the process starts in step S200. Then the process passes to step S202. In step S202, a determination is made whether a "do not disturb" is enabled. If yes, then the process passes to step S204. In step S204, the call is routed to the voicemail portion 130.

Alternatively, if no in step S202, i.e., the "do not disturb" is not enabled, then the process passes to step S206. In step S206, a determination is made whether screening is enabled. If no, then the process passes to step S208. Alternatively, if yes in step S206, then the process passes to step S207, in which the process determines whether the client is on the list. If no, then the process passes to step S204. In step S204, the call is routed to voicemail for the agent.

Alternatively, if yes in step S207, then the process passes to step S208. In step S208, the process determines whether the agent is in or out of the office. If the agent is in, then the process passes to step S210. In step S210, the call rings at the agent's desk phone.

Alternatively, if the process determines in step S208 that the agent is out of the office, then the process passes to step S212. In step S212, the process assigns a phantom station 121 and calls the agent at the forwarding number. The process also transfers the client to the DVA 340 in step S212.

After step S212, the process passes to step S214. In step S214, the process determines whether the agent has selected a preference indicating that the call is to be retrieved if unanswered. If no, then the process passes to step S216. In step S216, the process transfers the client from DVA to the phantom and conference.

In step S216, the phantom station 121 will continue to conference in on the call until the caller hangs up. Once the caller hangs up, the call will be terminated since the agent has not selected the retrieval function. Alternatively, if yes in step S214, i.e. the agent has selected the retrieval function, then the process passes to step S218. In step S218, the caller is prompted to press "1" or "0", for example. If the caller presses "1", then the process passes to step S222. In step S222, the phantom is cancelled. After step S222, the process passes to step S204 in which the caller is routed to voicemail.

Alternatively, if the caller selects "0" in step S218, then the process passes to step S220. In step S220, the process cancels the phantom and transfers the client to an attendant.

As described above, in step S218, the process determines whether the caller has selected "1" or "0". If the caller has not selected "1" or "0" in step S218, then the process passes to step S224.

In step S224, the process determines whether the agent has answered. i.e. the caller is waiting, before a predetermined time, i.e., a time-out period. If no then the process passes to step S228 and the process cancels the phantom. After step S228, the process passes to step S204, in which the call is routed to voicemail.

Alternatively, if the agent does answer before the time-out, then the process passes to step S226. In step S226, the process transfers the client. From the DVA 340 to the phantom station 121, which has been holding the client call. As a result, a conference call is set up between the agent, the calling client, as well as the phantom station 121 which remains a party in the conference call.

In accordance with the system and method of the invention, the client information memory 213 may utilize two tables, for example, for purposes of performing a matching process when a call comes to an agent. Specifically, the client information memory 213 utilizes a client table and an agent table. The call routing server 120, upon monitoring an incoming call, initially checks with the client table to determine if a match exists. If a match is found, the call routing server 120 then looks for a match between the matched entry in the client table and the agent table. If for some reason the client was defined, but did not have an assigned agent, the call routing server 120 using the attendant application 160 returns an indication that no records were located. Alternatively, if the call routing server 120 determines and finds the client ID the client table and an agent in the agent table (for that client), then the call routing server 120 generates a message in the attendant application 160 that at least one record was found. Additionally, the found information is provided. However, it should be appreciated that this feature would vary if a single client had multiple agents associated with that client.

As shown in FIG. 2, the relational memory 210 includes the agent table memory 211, the DID/line information memory 212, the client information memory 213, the forwarding numbers table memory 214, the caller ID screening table memory 215, the system information table memory 216, the incoming call detail memory 217 and the outgoing call detail memory 218.

The agent table memory 211 contains various information pertaining to the respective agent users. Specifically, the agent memory table 211 includes the agent's last name, the agent's first name, and the phone extension of the agent. Additionally, the agent table memory 211 may contain routing information including the permitted call level, i.e., whether all calls are permitted or whether some caller IDs are screened, use schedule information to route calls, in or out of office information, and call retrieval information. Additionally, the agent table memory 211 may include information regarding whether a particular agent is also a supervisor, an attendant and/or whether the agent is responsible for corporate accounts, for example. The agent application 150 or the attendant application 160 that may be used to change the data in the agent table memory 211.

The DID/line information memory 212 contains information regarding specific DID lines. For example, the specific number for the DID line may be provided in an advertisement for a particular house. Illustratively, the DID/line information memory 212 includes identifying information which is assigned automatically to an incoming call. This identifying information is then forwarded with the call to an appropriate agent, for example. Accordingly, the DID/line information memory 212 includes the DID line number, as well as a greeting which may be standard or set by an agent. Additionally, the DID/line information memory 212 may contain a dialogue generated by the agent, for example. The dialogue may prompt a caller to provide information. As should be apparent, the dialogue may be tailored to the particular objectives of the specific DID line.

The client information memory 213 in the relational memory 210 contains various information associated with each respective client. A client may be characterized as any person recognized by the office. In accordance with one embodiment of the invention, the client information memory 213 contains a client identification number or other client identifier. Additionally, the client information memory 213 contains information regarding the client's last name, the client's first name, address information, and any status information regarding the client, including whether the client is a friend, a long-term client or a short-term client, for example.

Additionally, the client information memory 213 contains a primary caller ID number, which is compared with the number of an incoming call. Further, the client information memory 213 may also contain a secondary caller ID number, with a maximum of three, for example. The client information memory 213 may contain a shared caller ID number. The client information memory 213 may also contain the name of the agent responsible for the client. The client information memory 213 may further include the caller facsimile number, e-mail address, and a notes field, which may be of any suitable length.

As shown in FIG. 2, the relational memory 210 additionally includes a forwarding number table memory 214. The forwarding numbers table memory 214 includes an agent identifier by which to identify the agent. The forwarding numbers table memory 214 also includes respective phone numbers for each agent. Each phone number is associated with a rank being (0, 1, or 2), for example. A phone number designated as a higher rank will be forwarded a call first. Additionally, the forwarding numbers table memory 214 may designate a type associated with each phone number. The types may include:

0—home phone,
1—cell phone,
2—office phone; or
3—other designated phone.

The types may be used to establish the ranking of forwarding, or alternatively, the ranking may be set by an agent based directly on a number and not the type of number.

The relational memory 210 additionally includes a caller ID screening table memory 215. For each agent, the caller ID screening table memory 215 includes an agent identifier and a set of client identifiers. Accordingly, the communication control system 100 may forward only calls from clients included in the set of client identifiers.

The system information table memory 216 also includes various information documenting the operation of the communication control system 100. Illustratively, the system information table memory 216 may contain information regarding the date and time of database revisions and additions. The system information table memory 216 may also contain information such as the time that a call was forwarded.

As shown in FIG. 2, the incoming call detail memory 217 contains various records generated from each call. In accordance with an embodiment of the invention, the information contained in the incoming call detail memory 217 includes the DID line that the incoming call came in on; the time the call came in, the caller ID of the incoming call, whether a caller ID was inserted by the attendant or agent, the agent that the incoming call was directed to, the final destination of the incoming call, and any information added to a call tag field, such as information added by an attendant, for example.

As shown in FIG. 2, the relational memory 210 also includes a outgoing call detail memory 218. The outgoing call detail memory 218 stores information regarding outgoing calls. Specifically, the outgoing call detail memory 218 records the station originating each call, i.e., the agent making the call, for example. Also, the outgoing call detail memory 218 stores the number dialed, the time at which the call was placed, the length of the call, and the trunk the call went out on.

Accordingly, the communication control system 100 shown in FIGS. 1 and 2 may be utilized to effectively and efficiently process incoming calls and outgoing calls while providing a variety of advantages. As described hereinafter, various additional aspects of the system and method of the invention will be described with reference to FIGS. 5–21.

FIGS. 5–21 illustrate various user interface screens. Specifically, FIGS. 5–12 illustrate user interface screens that are utilized by an attendant user and generated by the attendant application 160. FIGS. 13–21 illustrate user interface screens utilized by an agent user and generated by the agent application 150. Hereinafter, various aspects and features of the communication control system 100 will be explained with reference to FIGS. 5–21.

Figure 5:
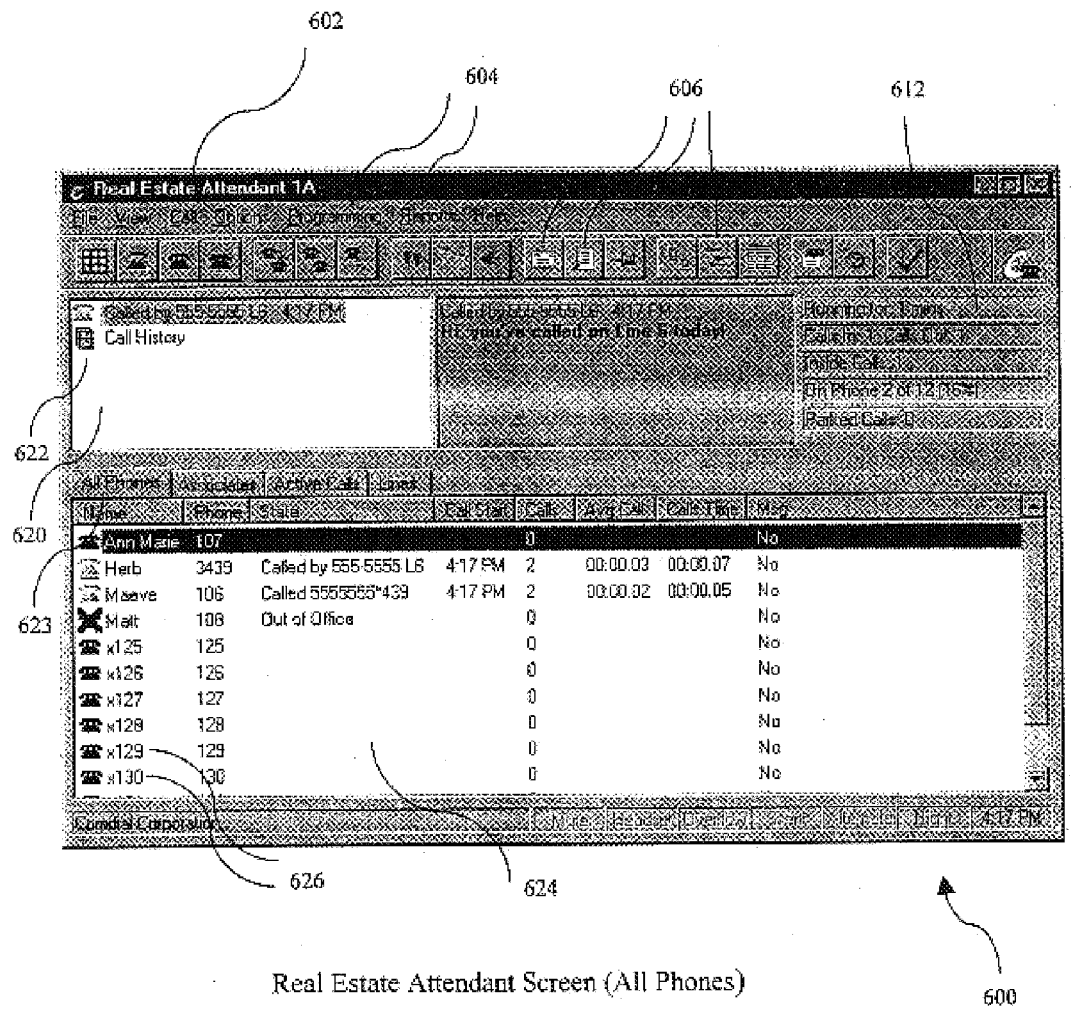
FIG. 5 is a diagram showing an exemplary user interface of an attendant in accordance with an embodiment of the system and method of the invention.

FIG. 5 illustrates an exemplary user interface screen 600 for an attendant user. The user interface screen 600 is generated by the call routing server 120 using the agent application 150. The attendant user interface screen 600 may be implemented on any suitable computer or computers or other operating system. The attendant user interface screen 600 includes a title bar 602. As suggested by the title bar 602, the attendant user interface screen 600 shown in FIG. 5 is generated by the attendant application 160 for interaction with an attendant user. The attendant user interface screen 600 includes menu labels 604, which may be provided for any of a wide variety of purposes. Additionally, the attendant user interface screen 600 includes control buttons 606, which are also readily adaptable to a user's needs or requirements. The control buttons 606 as shown in FIG. 5 are merely for purposes of illustration unless described further below. The attendant user interface screen 600 also includes an information display window 620, which displays previous call history. An information box 612 displays further specifics. Illustratively, the information box 612 displays the time that that attendant has been logged onto the system, i.e., the running time; displays the number of calls to the agent and from the agent; and displays the number of internal calls, or example.

A subscreen 624 contains selectable items 626 and, as illustrated in FIG. 5, is generated by the attendant application 160 in response to an attendant user selecting the "all phones" selection tab 623.

FIG. 5 also includes selection tabs 623 including associates, active calls and lines. The selection tabs 623 may be chosen by the attendant user to access various features, as is described further below.

In accordance with one aspect of the system and method of the invention, the attendant application 160, for example, utilizes an "out of office" command. This signals all other components of the communication control system 100 that the phone's user is not in the office. In accordance with an embodiment of the invention, the phone will show a large "X" over the agent's phone icon when the agent is in "out of office" mode. Illustratively, an attendant may obtain this feature from a suitable menu or by using the mouse and right clicking any phone, for example.

Figure 6:
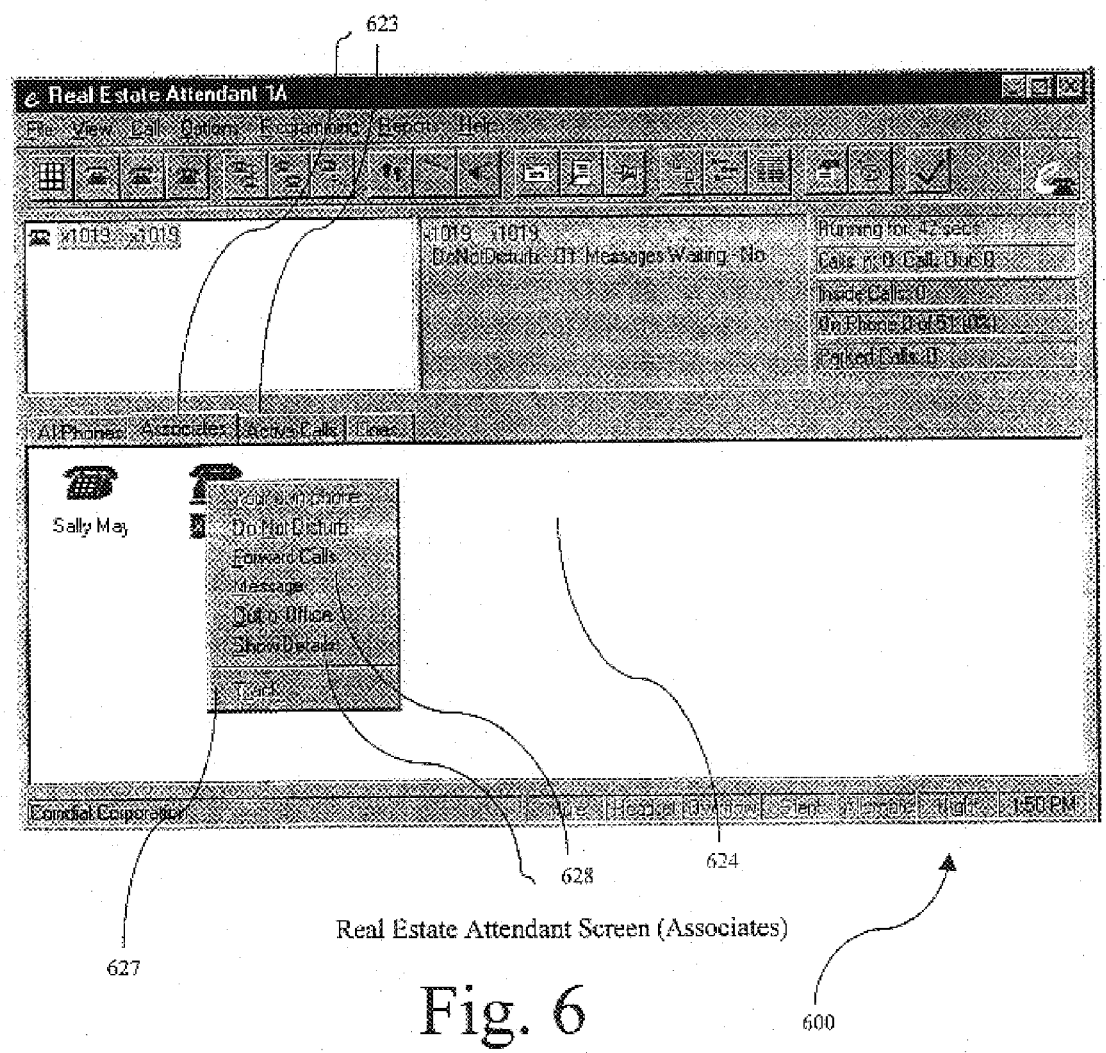
FIG. 6 is a diagram showing an exemplary user interface of an attendant according to a further aspect of the invention in accordance with an embodiment of the system and method of the invention.

FIG. 6 illustrates further aspects of the invention. In accordance with the system and method of the invention, an agent's routing parameters may be changed based on the preferences of the agent. Illustratively, a user interface box is generated by the attendant application 160 as shown in FIG. 6. Specifically, the attendant user selects the "associates" selection tab 623. In response, the attendant application 160 displays a phone icon representing each associate in the firm. As shown in FIG. 6, there are two associates in the organization.

To access an agent's routing parameters, a user may right click using a mouse, for example, on the agent's phone icon. In response, the attendant application 160 displays the drop down menu box 627, as shown in FIG. 6. The attendant user may then select the "show details" option from the drop down menu, as well as change the in/out office status, the forwarding numbers, and the screening criteria. For example, the routing parameters may be changed by the attendant user, as well as the web-based supervisor application or by the agent herself.

In accordance with the invention, if an attendant puts an agent's phone in a "do not disturb" mode using the drop-down menu box 627, then call routing is by-passed. Specifically, in "do not disturb" mode, all calls are immediately forwarded to the agent voicemail box 130.

Figure 7:
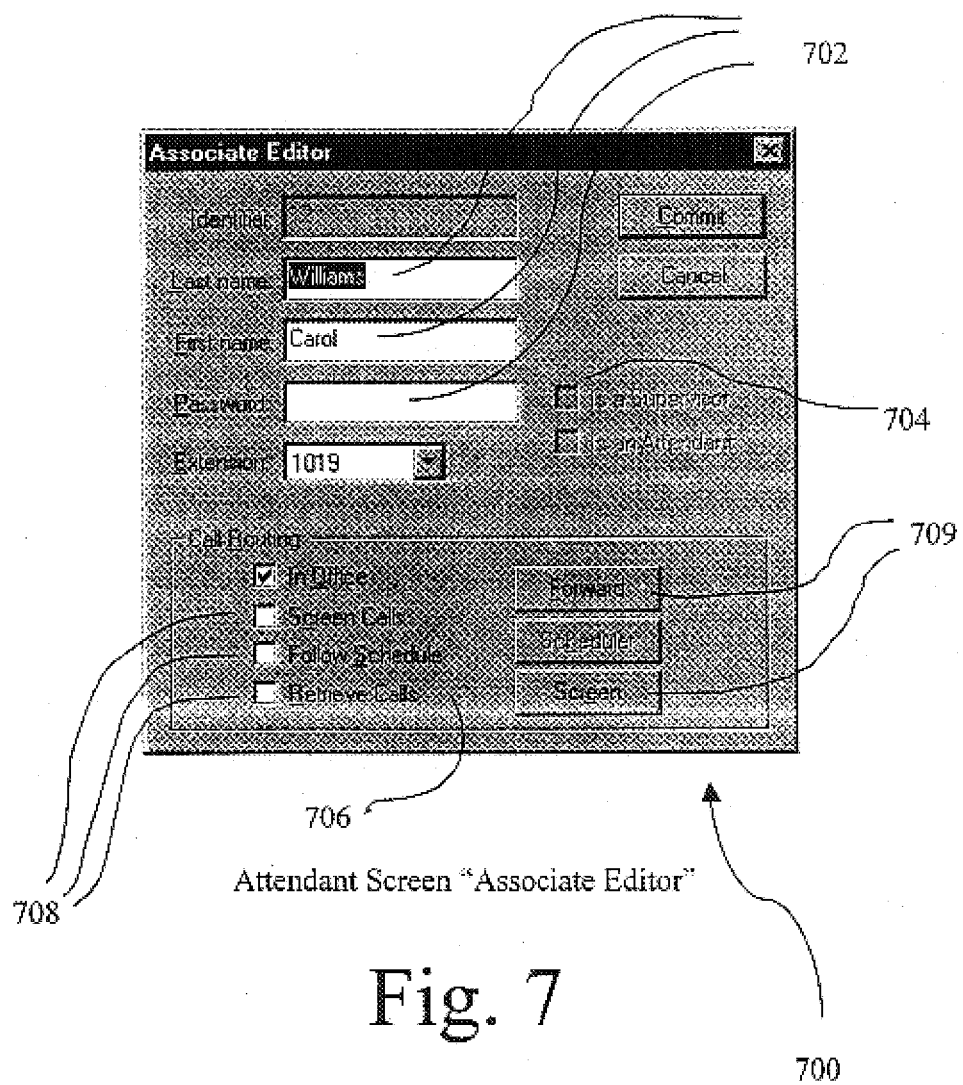
FIG. 7 is a diagram showing an exemplary associate or agent "editor screen" according to an aspect of the attendant in accordance with an embodiment of the system and method of the invention.

FIG. 7 is a diagram showing an "agent editor" user interface screen 700 generated by the attendant application 160. The user interface screen 700 includes data entry boxes 702 and check boxes 704, which indicate whether the selected agent is also a supervisor or attendant. Additionally, the attendant user interface screen 700 includes a call routing pane 706. The call routing pane 706 includes checkboxes 708 and push buttons 709. The user interface screen 700 is generated by the attendant application 160 in response to a user selecting the show details option in the drop down menu box 627 as shown in FIG. 6. As shown in FIG. 7, the user interface screen 700 illustratively includes the agent's name, password and extension in the data entry boxes 702.

As shown in FIG. 7, the in-office checkbox 708 is selected. If the in-office option is checked, this is an indication that the agent is currently in the office. As a result, an attendant can be aware of this status and forward a call, which has come in to the agent on a general number for example, to the agent's phone. If the agent does not then answer the call, then the call routing server 120 will roll the call to the agent's voicemail box 130. Further, as described above, on the attendant user interface screen 600 shown in FIG. 5, the agent's representative phone icon will have a large "X" over their phone if that agent is out of the office.

In accordance with the system and method of the invention, in the call routing pane 706, the "screen calls" checkbox 708 may be selected. If the screen calls option is selected, then the call routing server 120 checks all incoming calls, which have originally come into an attendant, against a screening list before arriving at the agent's desk. As a result of this check, if the caller is on the allowed list, then the call routing server 120 forwards the caller to the agent's desk. Alternatively, if the caller is not on the allowed list, then the call routing server 120 forwards the caller to the agent's voicemail box 130.

As shown in FIG. 7, a further selection in the call routing pane 706 is "follow schedule" checkbox 708. Using this option, the communication control system 100 controls routing of calls based on a pre-determined schedule. Illustratively, during core work hours of 8 to 5, the screening list may include more names than during "off hours," since the agent may screen more calls during off-hours than during business hours.

As shown in FIG. 7, a further option in the call routing pane 706 is the "retrieve calls" checkbox 708. In accordance with the invention, if the retrieve calls box is checked, then forwarded calls, which remain unanswered, are retrieved by the communication control system 100 and sent to voicemail box 130.

The user interface box as shown in FIG. 7 also includes a "forward" push button 709 and a "screen" push button 709. The "forward button" 709 causes the attendant application 160 to generate or pop the dialog, shown in FIG. 8, used the set the forwarding sequence. Additionally, the "screen button" 709 causes the attendant application 160 to generate or pop the dialog shown in FIG. 9, from which the user can set which calls are allowed through, i.e., not filtered out, during enablement of the screening mode.

Figure 8:
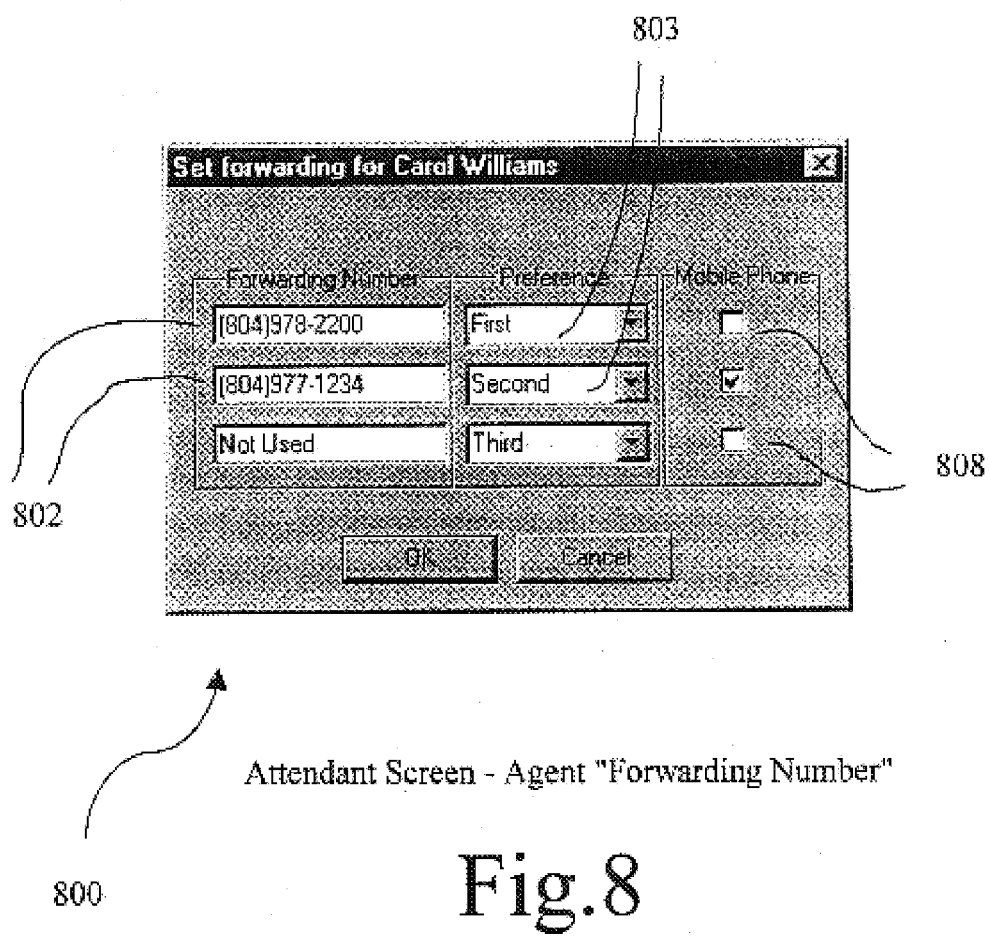
FIG. 8 is a diagram showing an exemplary agent "forwarding number" screen according to an aspect of the attendant in accordance with an embodiment of the system and method of the invention.

FIG. 8 illustrates an exemplary attendant user interface screen 800 generated by the attendant application 160 that provides a dialogue to change the forwarding numbers for an agent. The user interface screen 800 includes data entry boxes 802 and 803, which contain "forwarding numbers" and "preferences", respectively. Additionally, the user interface screen 800 includes mobile phone checkboxes 808. The mobile phone checkbox 808 indicate whether the associated number is for a mobile phone. If so, this allows additional time during transfer to locate the mobile phone.

In accordance with an embodiment the invention, the agent can have up to three numbers in their forwarding number sequence. The numbers may be ranked from first to third. The user interface screen 800, shown in FIG. 8, includes two forwarding numbers shown in data entry boxes 802. The data entry boxes 803 indicate the preferences, i.e., order, of these two forwarding numbers. If the agent is out of the office and has the forward option enabled, the attendant application 160, for example, forwards incoming calls to the agent's first preference, i.e., 804-978-2200. If the caller at that number does not answer, the 120 retrieves the call and forwards the call to the second preference number. If the call is still not answered, the 120 will retrieve the call and forward the call to the third preference, if a third preference exists. Accordingly, the call will be forwarded through all the preferences or until answered. If the call is never answered, then the communication control system 100 retrieves the call and transfers the call to voicemail box 130, assuming the "retrieved calls" flag is enabled.

In accordance with one embodiment of the invention., the forwarding number sequence may be changed according to the following procedure. The attendant user may click on the forwarding number box desired to be changed. Then, the user may type a new phone number. As should be apparent, the user may then select whether that new phone number is the first, second or third preference. Additionally, the user may check whether the mobile phone option is applicable. The user then confirms that each of the preference numbers are indeed unique, i.e. no forwarding numbers are repeated. Finally, the user may click OK to save the changes. As shown in FIG. 8, the title bar at the top of the user interface screen 800 indicates the agent for which the forwarding numbers are changed.

Figure 9:
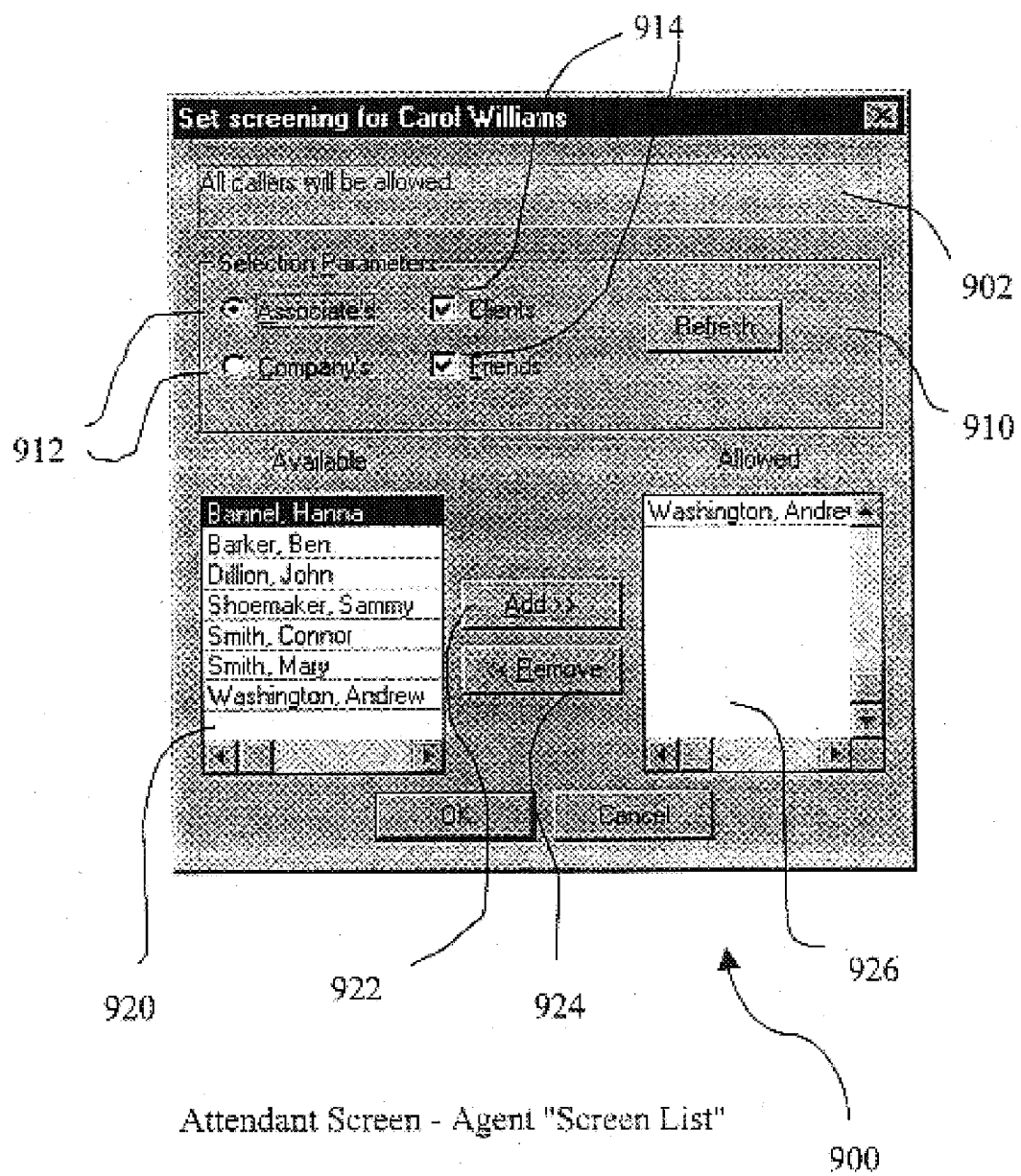
FIG. 9 is a diagram showing an exemplary agent "screen list" screen according to an aspect of the attendant in accordance with an embodiment of the system and method of the invention.

FIG. 9 shows an attendant user interface screen 900 providing a dialogue box for an attendant to change the "screen list" for an agent. The attendant user interface screen 900 includes an information pane 902 and a selection parameters pane 910. The selection parameters pane 910 includes "associate" and "company" selection buttons 912 and "client" and "friends" selection checkboxes 914. The attendant user interface screen 900 also includes an available person data entry screen 920 and an allowed person data entry screen 926. The add button 922 and the remove button 924 allows an attendant user to modify the allowed person data entry screen 926.

Specifically, in accordance with the system and method of the invention, the user interface screen 900, as shown in FIG. 9, allows an attendant, for example, to build a list of clients and/or friends from whom an agent wants to selectively receive calls. If the agent has the "screen calls" option enabled, then only those clients/friends in the allowed list shown in the allowed person data entry screen 926 will be transferred to the agent's phone. All other callers will be transferred to the voicemail box 130. In accordance with the invention, it should be appreciated that a client/friend can have multiple phone numbers associated with that client/friend. As shown in FIG. 9, the information pane 902 of the user interface screen 900 indicates whether or not screening is enabled. The screening information displayed by the attendant application 160 in the form of the attendant user interface screen 900 is stored in the caller ID screening table memory 215 in the relational memory 210.

The available person data entry screen 920 displays a list of available persons. The available list, as the name implies, enhances the efficiency of an agent or attendant user to select persons for placement into the allowed list displayed by the allowed person data entry screen 926. To explain, an agent user may be leaving for the day and know that she does not need to be concerned with any of the company's clients or friends, nor the agent's friends. However, the agent is concerned that she might miss an important call from one of her client's, i.e., the associate's clients. As a result, it is helpful if the available list displayed by the available person data entry screen 920 could be generated by the attendant application 160 to only show clients of the associate. The selection parameters shown in the selection parameters pane 910 allows such a list to be generated. Specifically, the selection parameters 912 and 914 are used to build the available list. If the "associate's" selection button 912 is checked, then only the associate's list of clients/friends are included, assuming that each of the clients and friends selection checkboxes 914 are checked. Similarly, if the "company's" selection button 912 is checked, then only the clients/friends of the company are displayed in the available list.

The clients and friends selection checkboxes 914 control whether clients only, friends only or both are included in the available list. To reflect parameter changes in the available list, a user may click on the refresh button in the selection parameters pane 910.

In accordance with the one embodiment of the system and method of the invention, to add a client or friend to the allowed list, the user may perform a series of steps. Specifically, the user may highlight the client/friend in the available list. Then the user clicks the add button. As a result, the attendant application 160 places the client/friend in the allowed list displayed by the allowed person data entry screen 926.

Alternatively, to remove a client/friend from the allowed list, the user performs a different series of steps. Specifically, the user highlights the client/friend in the allowed list that is desired to be removed. The user then clicks the remove button, as shown in FIG. 9. As a result, the attendant application 160 removes the client/friend from the allowed list.

In summary, to change the available list, the user first clicks the parameters in the selection parameters pane 910 that the user wishes to apply. Then, the user clicks the refresh 29 button. The attendant application 160 will then display a new available list based on the specified criteria. A user may then add or remove entries from the allowed list as described above. In accordance with the one embodiment, entries will remain in the allowed list even though that particular person may not be listed in the available list, i.e., as a result of a change in the selection parameters. However, in accordance with another embodiment, names in the allowed list will automatically be deleted if they are not in the available list subsequent to a "refresh" of the available list.

In accordance with the system and method of the invention, each of the agent, attendant and supervisor may have limited access to both view information in the communication control system 100, as well as to modify information contained in the communication control system 100. Illustratively, the attendant may view the client data, but not change the client data.

Figure 10:
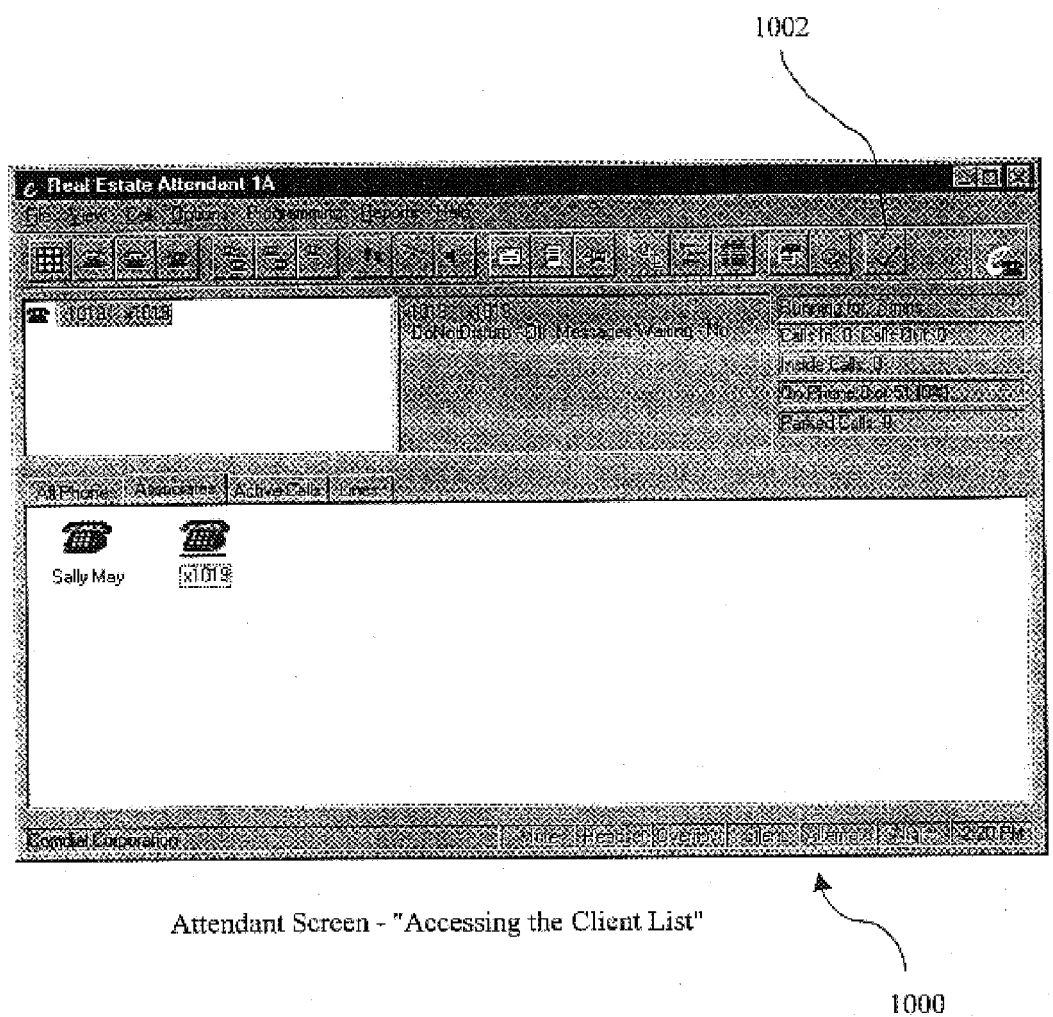
FIG. 10 is a diagram showing an exemplary user interface illustrating "accessing the client list" by the attendant in accordance with an embodiment of the system and method of the invention.
Figure 11:
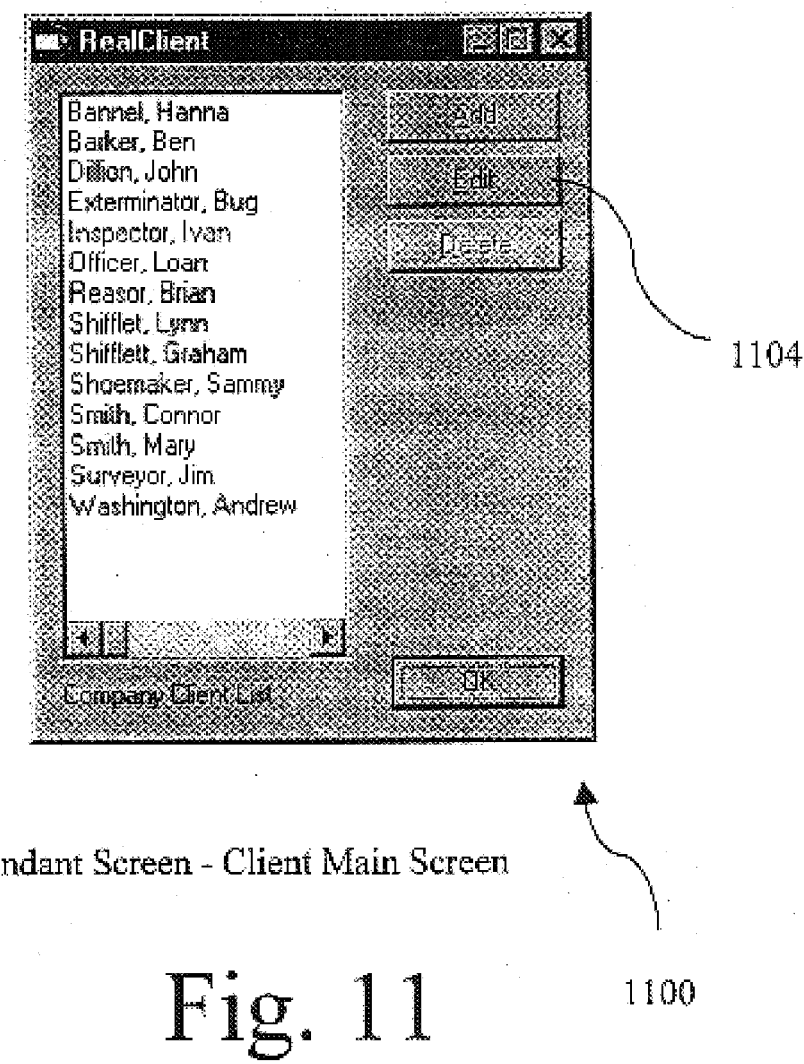
FIG. 11 is a diagram showing an exemplary client main screen according to an aspect of the attendant in accordance with an embodiment of the system and method of the invention.
Figure 12:
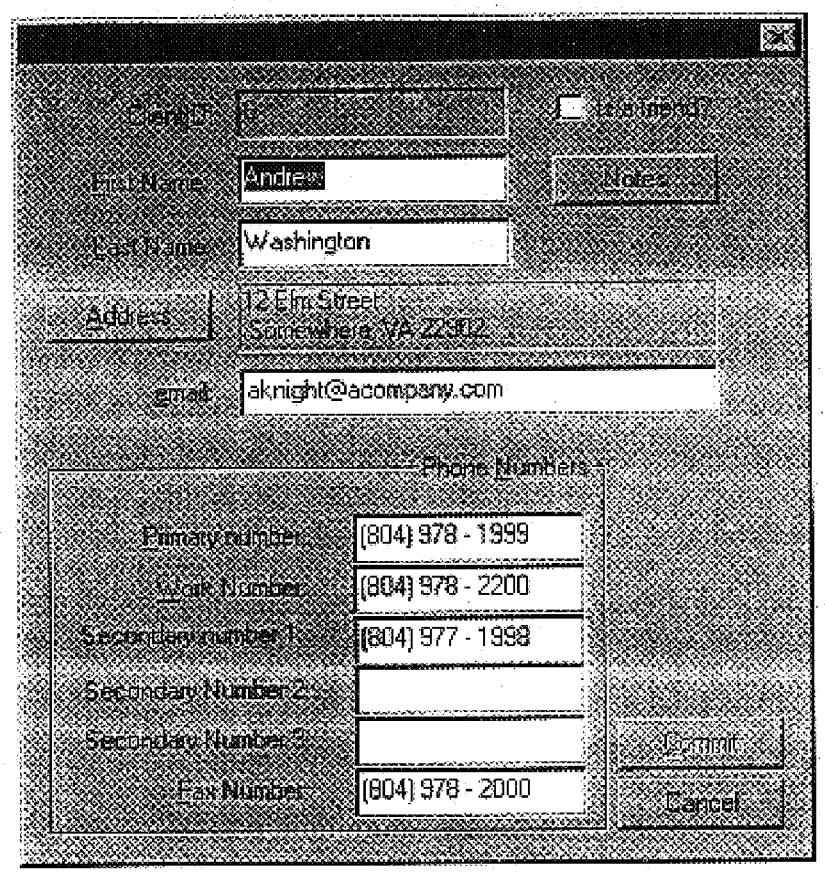
FIG. 12 is a diagram showing an exemplary "view client data" screen according to an aspect of the attendant in accordance with an embodiment of the system and method of the invention.

FIG. 10 illustrates a further example of an attendant screen 1000, similar to the screen shown in FIG. 6. In accordance with this embodiment, the user may highlight the check button 1002, as shown in FIG. 10. As a result, the attendant application 160 generates the dialog screen 1100 as shown in FIG. 11. Thereafter, the attendant may view information of a client simply by highlighting the client the attendant user wishes to see, and then clicking on the edit button 1104, for example. As a result, the attendant application 160 generates the "view client data" dialog screen 1200, as shown in FIG. 12. The dialog screen 1200 as shown in FIG. 12 includes various information regarding a particular client, including address, e-mail, and primary telephone number, for example. However, it should be appreciated that the information contained in the dialog screen as shown in FIG. 12 may include other information as is necessary or desirable.

FIGS. 5–12 illustrated aspects of an attendant's dialogue screen. Hereinafter, further aspects of the agent user using the agent application 150 will be described in accordance with embodiments of the system and method of the invention with reference to FIGS. 13–21.

Figure 13:
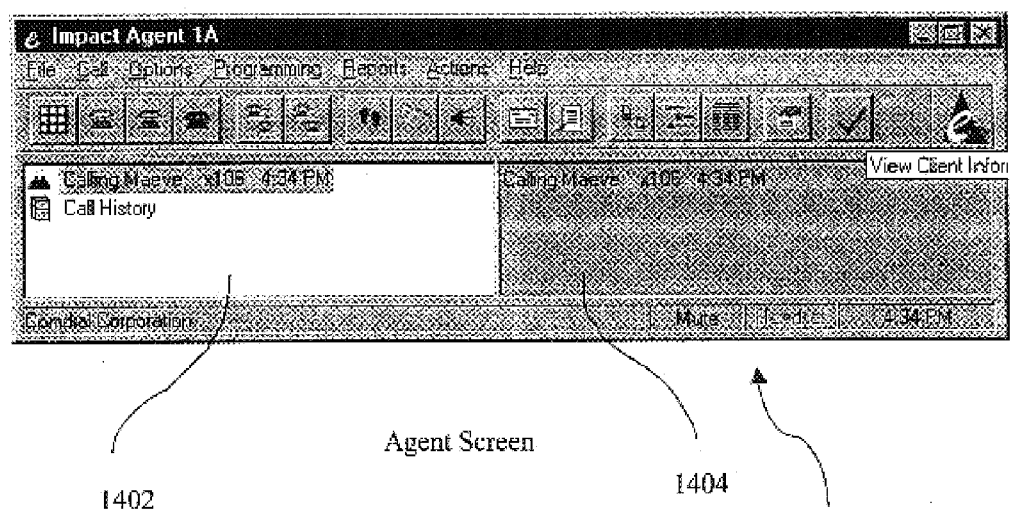
FIG. 13 is a diagram showing an exemplary user interface for an agent according to an embodiment of the system and method of the invention.

Illustratively, FIG. 13 shows a dialog screen for a real estate agent. As shown in FIG. 13, the agent application 150 generates an agent user interface screen 1400 to allow interaction of the agent application 150 with an agent user. The agent user interface screen 1400 includes a subscreen 1402 and an information box 1404. As shown in FIG. 13, the subscreen 1402 shows a variety of information including the status of the phone of the current agent. Additionally, the subscreen 1402 includes a "call history" item. The "call history" item may be selected by a user to show the call history of the agent.

Figure 14:
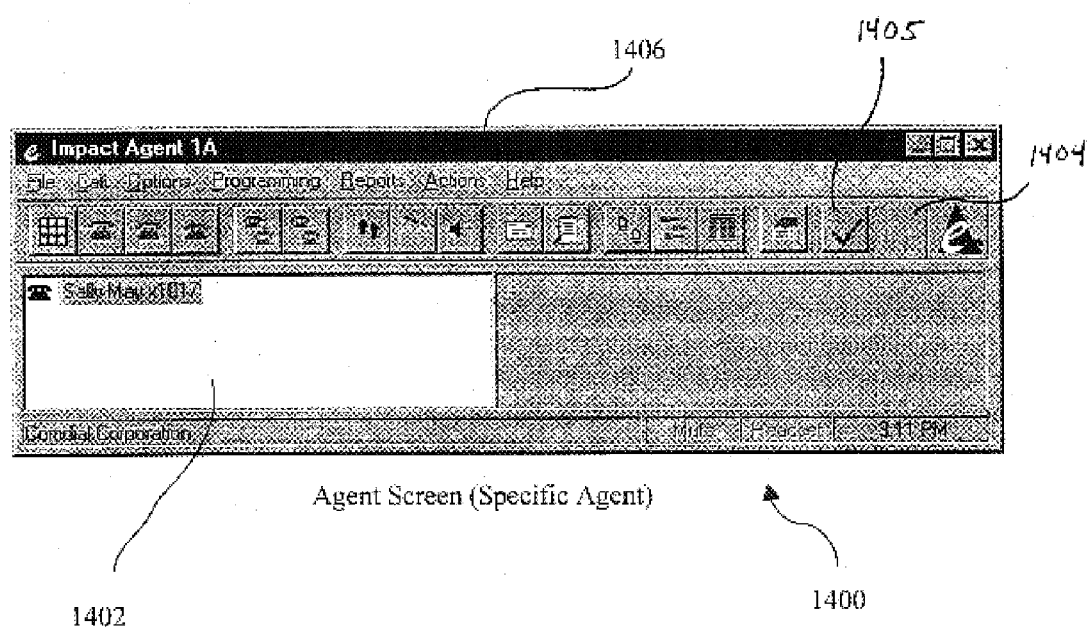
FIG. 14 is a diagram showing an exemplary user interface for an agent according to a further aspect of the agent in accordance with an embodiment of the system and method of the invention.

FIG. 14 illustrates a modified version of the agent user interface screen 1400. The agent user interface screen 1400 includes a subscreen 1402 as shown in FIG. 14. The subscreen 1402 includes an icon representing the agent user's phone. In accordance with an embodiment, the agent application 150 may generate the dialog screen as shown in FIG. 13, when the agent's phone as shown in FIG. 14 is selected. Accordingly, it should be appreciated that the client and other information described above may be generated and displayed in any of a variety of manners.

Illustratively, a button 1405 may be added to a toolbar 1404 in the agent user interface screen 1400 for easily accessing and viewing client information. Pressing such a button will shown different things depending on the status of the respective agent. If not on a telephone call, then pressing the button will show a list of all clients for that particular agent. Alternatively, if the agent is on a call with a known client, pressing the client button may show that client's information. Further, if on a call, but the client is not yet known, pressing the button may show a list of possible clients based on the caller ID information, e.g., such as with a shared number.

Figure 15:
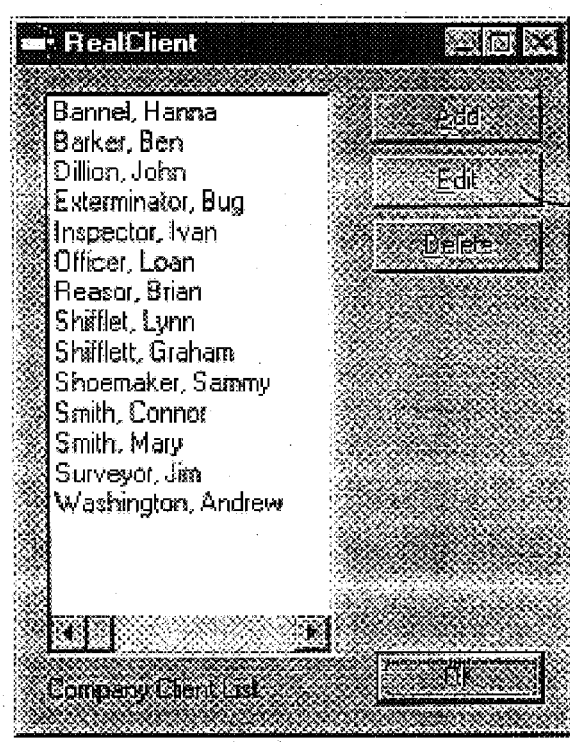
FIG. 15 is a diagram showing an exemplary "client list editor" screen according to an aspect of the agent in accordance with an embodiment of the system and method of the invention.

It should be appreciated that the client list may be accessed using any suitable means. Illustratively, the button 1405 as shown in FIG. 14 may be selected by the agent user to generate a client list, as shown in FIG. 15. As shown in FIG. 15, the agent user interface 1500 provides the user with a list of clients, as well as push buttons 1504. An agent user may utilize the push buttons 1504 to manipulate the client list to edit the client list, for example.

Figure 16:
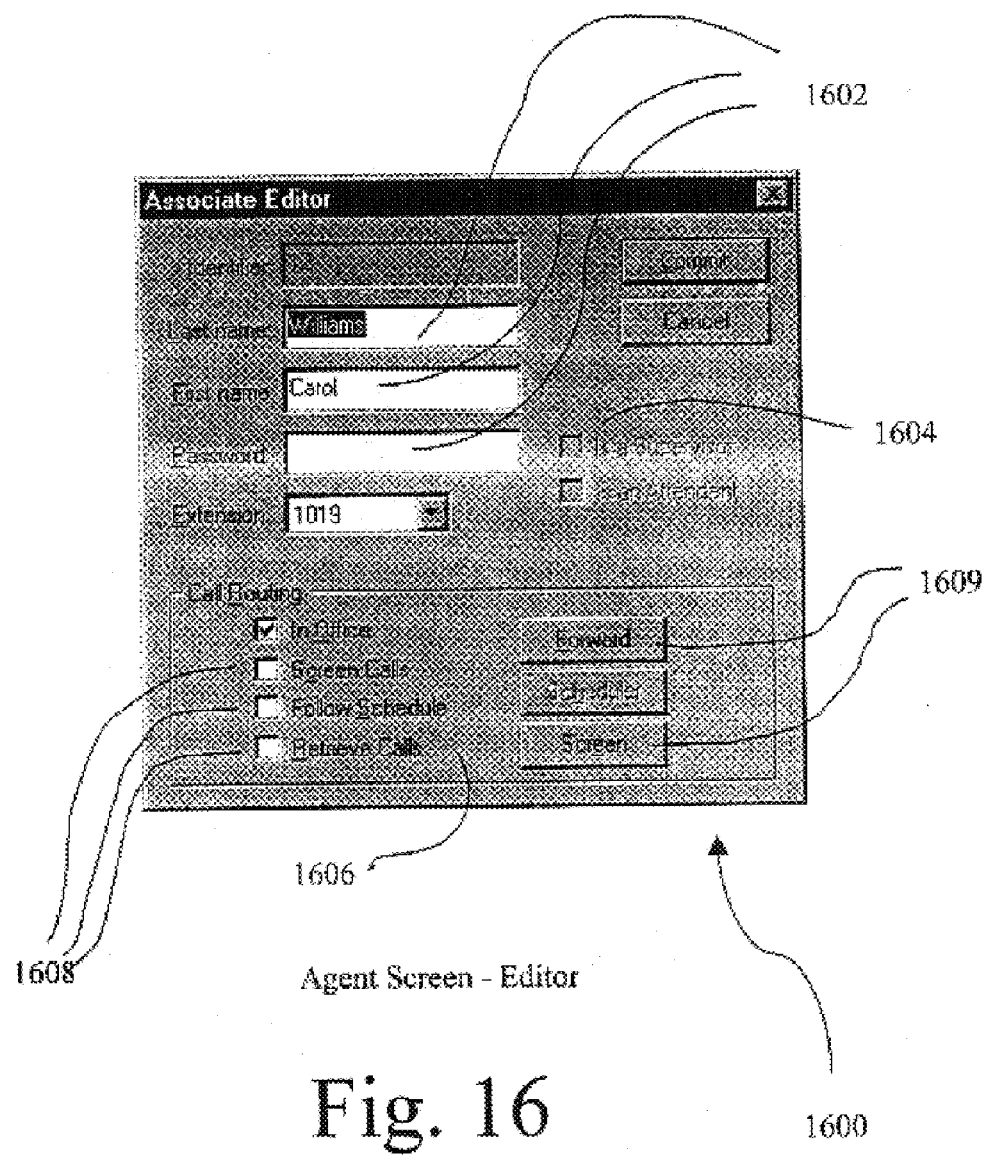
FIG. 16 is a diagram showing an exemplary agent "editor" screen according to an aspect of the agent in accordance with an embodiment of the system and method of the invention.

FIG. 16 shows an "editor" interface screen 1600 generated by the agent application 150 for interaction with an agent user, similar to that shown in FIG. 7 for an attendant user. The user interface screen 1600 includes data entry boxes 1602 and check boxes 1604, which indicate whether the selected associate is also a supervisor or attendant. Additionally, the agent user interface screen 1600 includes a call routing pane 1606. The call routing pane 1606 includes checkboxes 1608 and push buttons 1609. The user interface screen 1600 is generated by the agent application 150 in response to a suitable command by the agent user. As shown in FIG. 7, the agent user interface screen 1600 illustratively includes the agent's name, password and extension in the data entry boxes 1602.

If the "in office" option is checked, as shown in FIG. 16, this indicates that the agent is currently in the office. Accordingly, all calls to the agent's number may be sent to the agent's phone, depending on the routing parameters set for the agent. In the case that the agent does not answer the call, then the call will roll to the voicemail box 130.

Additionally, the call routing pane 1606 includes a screen calls checkbox 1608. If the screen calls option is set, then all incoming calls are checked against the screening list before being forwarded to the agent's desk. In the case that the caller is not on the allowed list, that caller will be forwarded to voice mail. Additionally, as shown in FIG. 16, the call routing pane 1606 includes a "follow schedule" checkbox. If selected, the "follow schedule" checkbox operates in a manner similar to "follow schedule feature" described in conjunction with FIG. 7 above.

Additionally, the call routing pane includes a retrieve calls checkbox 1608. If the retrieve calls box 1608 is checked, then forwarded calls which remain unanswered are retrieved and sent to voice mail.

Figure 17:
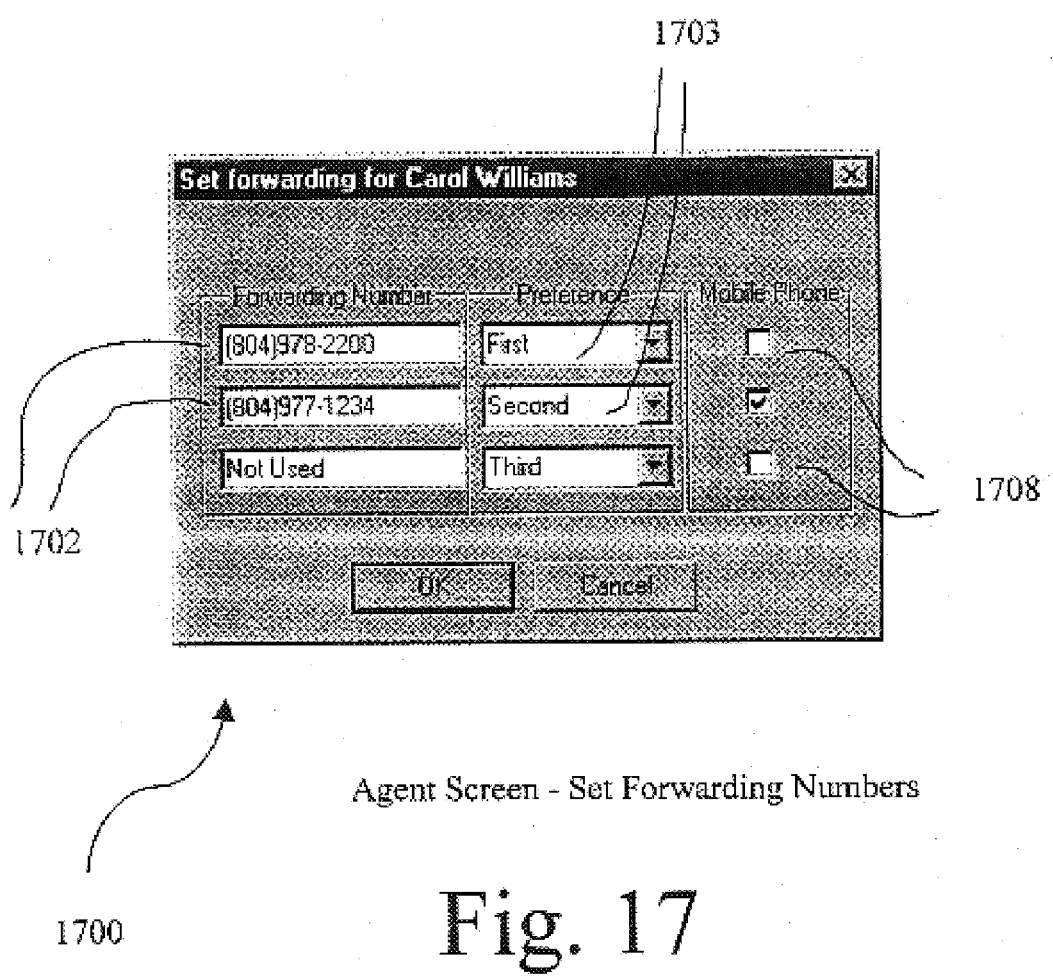
FIG. 17 is a diagram showing an exemplary "set forwarding numbers" screen according to an aspect of the agent in accordance with an embodiment of the system and method of the invention.
Figure 18:
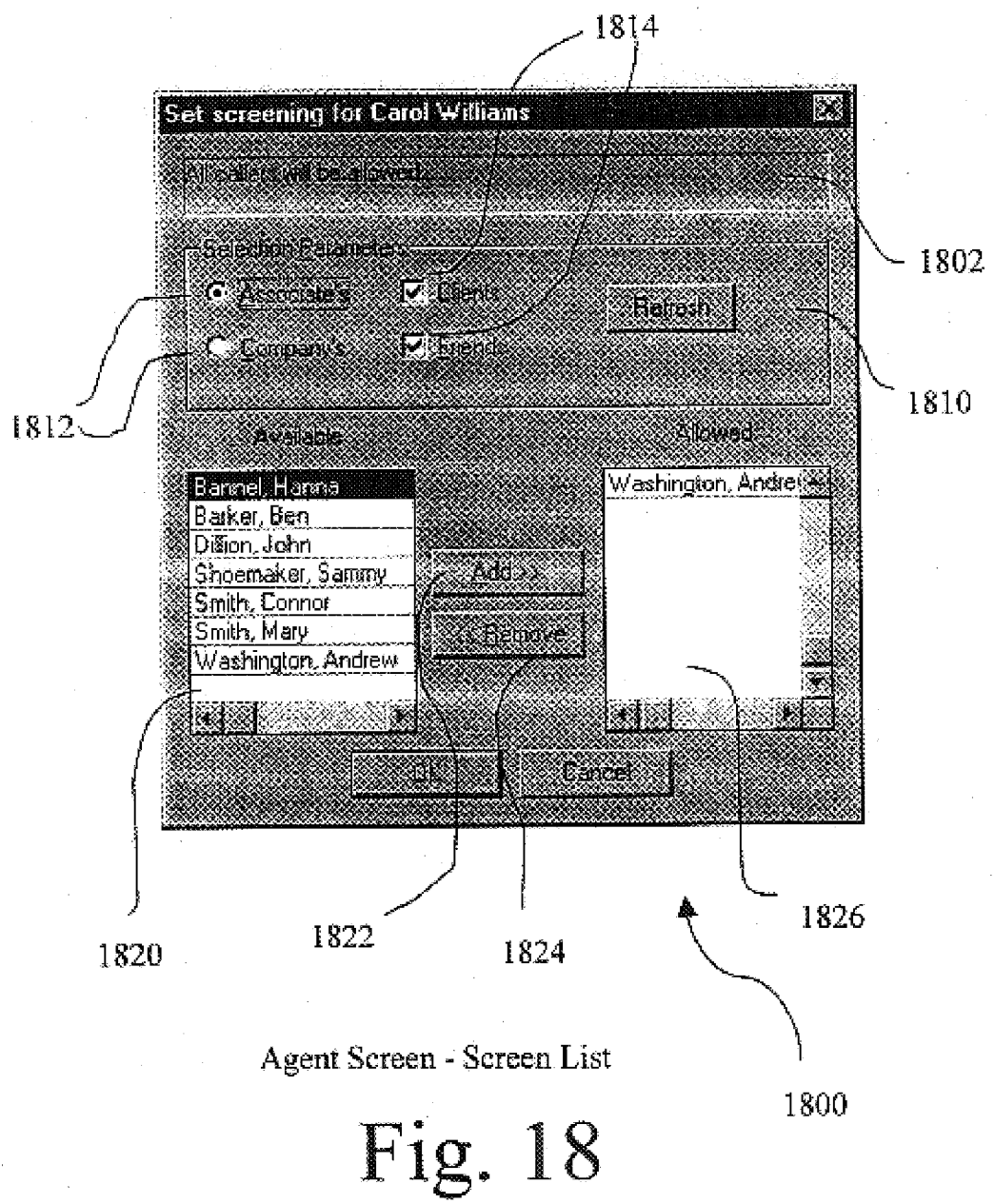
FIG. 18 is a diagram showing an exemplary agent "screen list" screen according to an aspect of the agent in accordance with an embodiment of the system and method of the invention.

Also, the agent-editor screen 1600 as shown in FIG. 16 includes "forward" and "screen" buttons 1609. In accordance with an embodiment, the forward button pops a dialog used to define the forwarding sequence, as shown in FIG. 17. Additionally, the "screen" button 1609 pops a dialog, as shown in FIG. 18, from which the user can set which calls are allowed through when the screening mode is enabled.

FIG. 17 shows a "set forwarding numbers" user interface screen 1700 for an agent user, generated by the agent application 150, that provides a dialogue to change the forwarding numbers for an agent. The user interface screen 1700 includes data entry boxes 1702 and 1703, which contain "forwarding numbers" and "preferences", respectively, similar to the user interface shown in FIG. 17. Additionally, the user interface screen 1700 includes mobile phone checkboxes 1708. The mobile phone checkboxes 1708 indicate whether the associated number is for a mobile phone. If so, this allows the call routing server 120 or the attendant application 160 to provide additional time during transfer to locate the mobile phone.

In accordance with the system and method of the invention, the agent can have up to three forwarding numbers, as described above. After one number is selected by the agent, then all calls that are to be routed are delivered to the agent at that location. In accordance with an embodiment of the invention, the agent may change the forwarding number sequence using a series of steps.

Specifically, the agent may click on the forward button, which is shown in FIG. 16, to generate the agent "set forwarding numbers" user interface screen 1700 shown in FIG. 17. Then, the agent user may click on the forwarding number box 1702 that the agent user wishes to change. The agent user then types a new phone number. Then the agent user selects first, second or third preferences, as shown in FIG. 17. The agent user checks whether "mobile phone" is applicable. The agent user then checks whether the preferences are unique, i.e., are all the numbers different. Then, the agent user may select "OK" to allow the agent application 150 to save the changes.

FIG. 18 shows an agent "screen list" in accordance with an embodiment of the invention. As shown in FIG. 18, the agent user interface screen 1800 includes an information pane 1802 and a selection, parameters pane 1810. The selection parameters pane 1810 includes "associate" and "company" selection buttons 1812 and "client" and "friends" selection checkboxes 1814. The agent user interface screen 1800 also includes an available person data entry screen 1820 and an allowed person data entry screen 1826. The add button 1822 and the remove button 1824 allows an agent user to modify the data entry screen 1826. The operation of the agent user interface screen 1800 is similar to the operation described in conjunction with the attendant user interface shown in FIG. 9.

As shown in FIG. 18, the agent "screen list" allows the agent to build a list of client and/or friends from which the agent wishes to receive calls. If the agent has the screen call option enabled, then only those clients/friends in the "allowed list" will be transferred to the agent's phone. All others not on the allowed list will be transferred to the voicemail box 130.

As shown in FIG. 18, the information pane 1802 of the agent user interface screen 1800 indicates whether or not screening is enabled. Further, the selection of parameters shown in the selection parameters pane 1810 may be used to build the "available list." Specifically, if the agent's button is checked in the selection parameters pane, then only the agent's list of clients/friends are included in the available list. Alternatively, if the company's button is checked, then only the clients/friends of the company are shown. Further, the client's and friend's checkboxes 1814 determine whether clients only, friends only, or both are included in the "available" list. To reflect parameter changes in the available list, the user may select the refresh button in the selection parameters pane 1810.

In accordance with an embodiment of the invention, to add a client/friend to the allowed list the user may perform a series of steps. Specifically, the agent may highlight the desired client/friend in the available list and then click on the add button. As a result, the agent application 150 moves the client or friend to the allowed list.

Alternatively, the agent may want to remove a client/friend from the allowed list. This may also be performed through a series of steps. To remove a client/friend from the allowed list, the agent first highlights the client/friend in the allowed list. Then, the agent selects the "remove" button. As a result, the agent application 150 will remove the client or friend from the allowed list.

Alternatively, the agent may desire to change the available list. To change the available list, the agent first selects the parameters that the user wishes to apply as shown in FIG. 18. Then, the agent selects the refresh button to reflect parameters in the available list.

Figure 19:
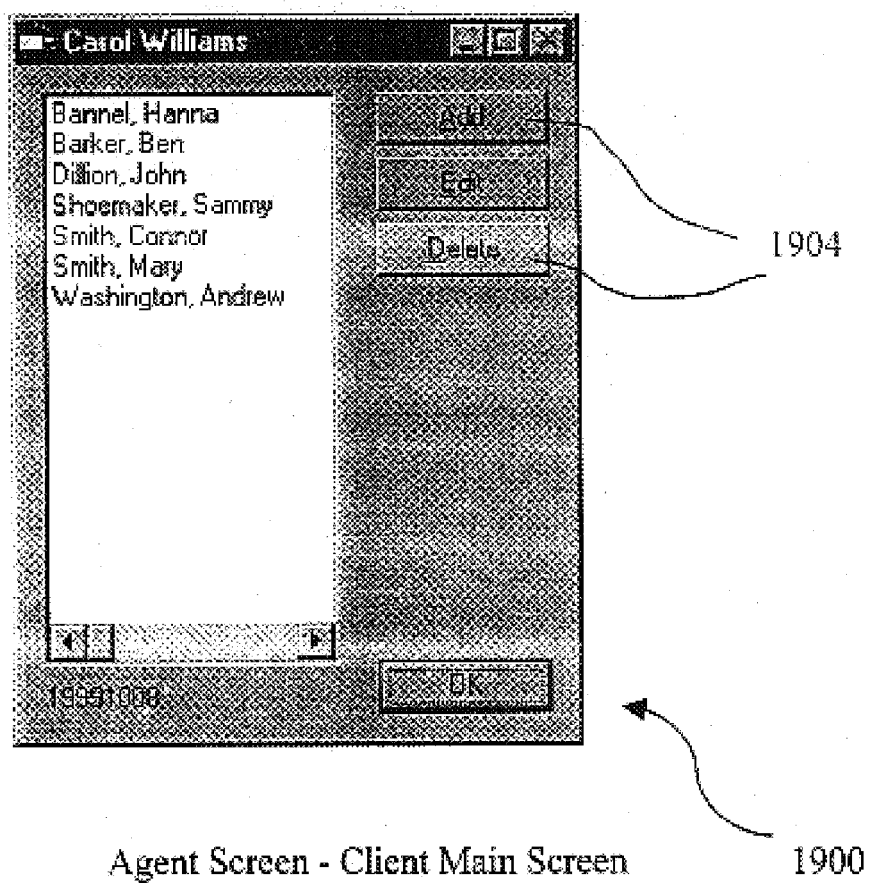
FIG. 19 is a diagram showing an exemplary "client main screen" according to an aspect of the agent in accordance with an embodiment of the system and method of the invention.
Figure 20:
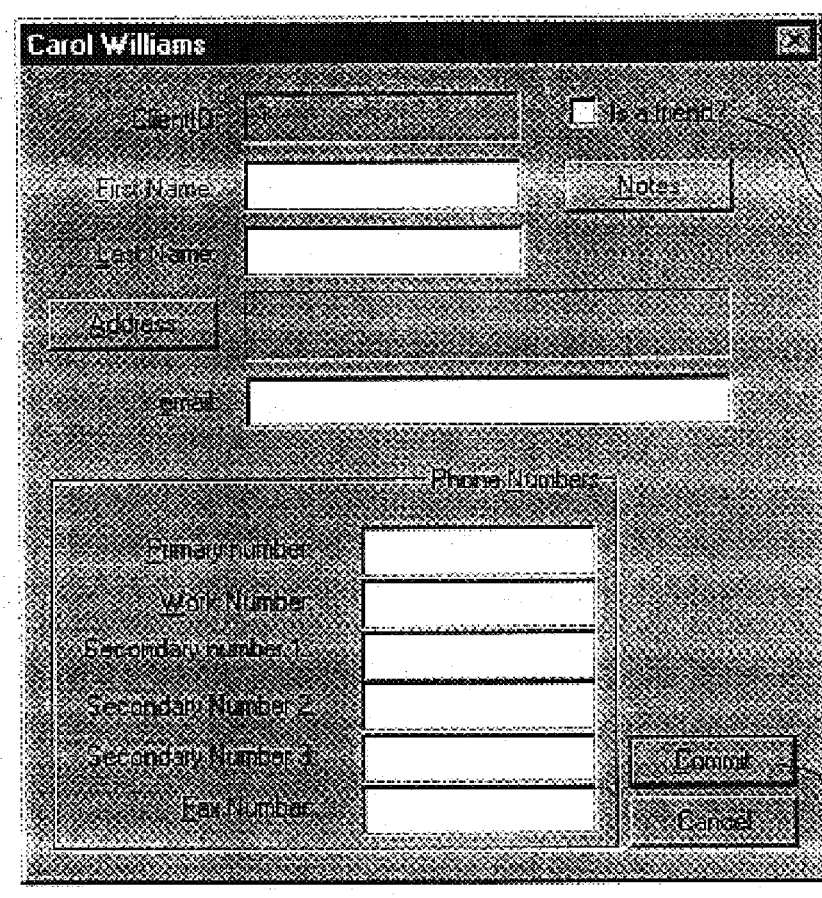
FIG. 20 is a diagram showing an exemplary "client add/edit" screen according to an aspect of the agent in accordance with an embodiment of the system and method of the invention.

FIGS. 19–25 illustrate additional screens which are generated by the agent application 150 and accessed from the agent's desktop. Illustratively, FIG. 19 illustrates an agent user interface 1900 including a "client main screen" which may be accessed from the agent's desk. The three options available from the main screen are provided by the add, edit and delete push buttons 1904. In accordance with an embodiment of a system and method of the invention, the agent may add a client by performing a series of steps. First, the agent selects the add push button 1904 in the screen as shown in FIG. 19. As a result, the agent application 150 generates the agent user interface 2000 including the "client add/edit" screen, as shown in FIG. 20.

Then, the agent may enter the first and last name of the client, the address of the client, the e-mail address of the client, and all known phone numbers for the client. As a result of entry of all the known phone numbers, the call routing server 120 may use the phone numbers to perform screen pops based on caller identification, as described above. If the entry is not a client, but rather a friend such as a spouse or plumber, for example, then the agent may click the "Is a friend" checkbox 2002. Then, after entering the data, the agent may select the commit button 2004 to save the changes.

As noted above, FIG. 19 illustrates a client main screen. In order to edit an existing client/friend from the client main screen as shown in FIG. 19, the agent first highlights the client/friend which is desired or necessary to edit. Then, the agent clicks on the edit button. As a result, the client add/edit screen as shown in FIG. 20 will appear with the previously entered data. Then, the agent completes the desired changes and then clicks on the commit button to save those changes.

Figure 21:
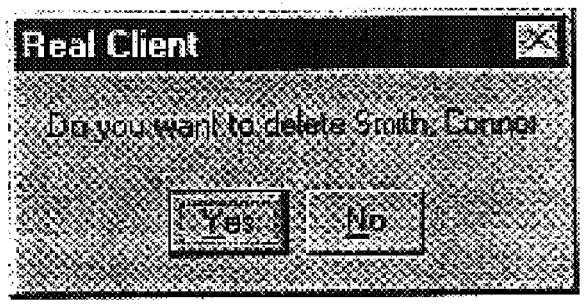
FIG. 21 is a diagram showing an exemplary "delete client confirmation" screen according to an aspect of the agent in accordance with an embodiment of the system and method of the invention.

Additionally, an agent may delete a client. In order to delete a client/friend from the client main screen as shown in FIG. 19, the agent first highlights the client/friend desired to be deleted. Then, the agent clicks on the delete button. A user interface message box 2100 will then appear as shown in FIG. 21 to confirm the deletion operation. Then, the agent may click "yes" to delete the client/friend or "no" to cancel the operation.

As described above, one embodiment of the system of the invention as shown in FIG. 1 is in the form of a computer or computer system. As used herein, the term "computer system" is to be understood to include at least one processor utilizing a memory or memories. The memory stores at least portions of an executable program code at one time or another during operation of the processor. Additionally, the processor executes various instructions included in that executable program code. An executable program code means a program in machine language that is able to run in a particular computer system environment to perform a particular task. The executable program code process data in response to commands by a user. As used herein, it will be appreciated that the term "executable program code" and term "software" mean substantially the same thing for the purposes of the description as used herein.

Further, it is to be appreciated that to practice the system and method of the invention, it is not necessary that the processor and/or the memory be physically located in the same place. That is, it should be appreciated that each of the processor and the memory may be located in geographically distinct locations and connected so as to communicate in any suitable manner, such as over a network, for example. Additionally, it should be appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations. Further, the memory could include or utilize memory stores from the Internet, Intranet, Extranet, LAN or some other source or over some other network, as may be necessary or desired.

As described above, the invention may illustratively be embodied in the form of a computer or computer operating system. It is to be appreciated that the software that enables the computer operating system to perform the operations described above may be supplied on any of a wide variety of data holding media. Further it should be appreciated that the implementation and operation of the invention may be in the form of computer code written in any suitable programming language, which provide instructions to the computer.

It should be appreciated that the software code or programming language that is utilized in a computer system to perform the above described invention may be provided in any of a wide variety of forms. Illustratively, the software may be provided in the form of machine language, assembly code, object code, or source language, as well as in other forms. Further, the software may be in the form of compressed or encrypted data utilizing an encryption algorithm.

Additionally, it should be appreciated that the particular medium utilized may take on any of a variety of physical forms. Illustratively, the medium may be in the form of a compact disk, a DVD, an integrated circuit, a hard disk, a floppy diskette, a magnetic tape, a RAM, a ROM, or a remote transmission, as well as any other medium or source of information that may be read by a computer or other operating system.

Accordingly, the software of the method of the invention may be provided in the form of a hard disk or be transmitted in some form using a direct telephone connection, the Internet, an Intranet, or a satellite transmission, for example. Further, the programming language enabling the system and method of the invention as described above may be utilized on all of the foregoing and any other medium by which software or executable program code may be communicated to and utilized by a computer or other operating system.

As described herein, the system and method of the invention may utilize an application program, a collection of separate application programs, a module of a program that is designed to handle, or a portion of a module of a program, for example. As noted above, it should be appreciated that the computer language used in the system and method of the invention may be any of a wide variety of programming languages. Further, it is not necessary that a single programming language be utilized in conjunction with the operation of the system and method of the invention. Rather, any number of different programming languages may be utilized as is necessary or desirable.

As described above, in the system and method of the invention, a variety of user interfaces are utilized. A user interface may be in the form of a dialogue screen for example. As used herein, a user interface includes any software, hardware or combination of hardware and software used an operating system that allows a user to interact with the operating system. A user interface may include any of a touch screen, keyboard, mouse, voice reader, voice recognizer, dialogue screen, menu box, a list, a checkbox, a toggle switch, a pushbutton or any other object that allows a user to receive information regarding the operation of the program and/or provide the operating system with information. Accordingly, the user interface is any device that provides communication between a user and a computer. The information provided by the user to the computer through the user interface may be in the form of a command, a selection or data, or other input, for example.

A user interface is utilized by an operating system running an application program to process data for a user. As should be appreciated, a user interface is typically used by a computer for interacting with a user either to convey information or receive information. However, it should be appreciated that in accordance with the system and method of the invention, it is not necessary that a human user actually interact with a user interface generated by the operating system of the invention. Rather, it is contemplated that the user interface of the invention interact. i.e., convey and receive information, in communication with another operating system or computer, rather than a human user. Further, it is contemplated that the user interfaces utilized in the system and method of the invention may interact partially with another operating system while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its preferred embodiment, it is to be understood that this disclosure is only illustrative and exemplary of the present invention and is made merely for the purposes of providing a full and enabling disclosure of the invention. The foregoing disclosure is not intended to be construed or to limit the present invention or otherwise to exclude any other such embodiments, adaptations, variations, modifications and equivalent arrangements, the present invention being limited by the claims and the equivalents thereof.

What is claimed is:

1. A communication system for routing and monitoring an incoming telephone call in an organization, the communication system comprising:

a telephone switch;

a server side, the server side including a computer telephone integration server, the computer telephone integration server including a call routing server and a memory portion for storing information, the call routing server monitoring the properties of incoming telephone calls and retrieving information from the memory portion based on monitored properties of the telephone call; and a client side, the client side including:

an agent telephone, the agent telephone for receiving selected telephone calls forwarded from the telephone switch; and an agent application, the call routing server monitoring the telephone call to the agent telephone and forwarding information regarding the telephone call to the agent application, the agent application displaying the information for viewing by an agent user;

an attendant telephone that receives selected telephone calls from the telephone switch prior to the telephone call being forwarded to the agent telephone; and an attendant application, the call routing server monitoring the telephone call to the attendant telephone and forwarding information regarding the telephone call to the attendant application, the attendant application displaying the information for viewing by an attendant user, the attendant application providing the attendant user with the capability to forward the telephone call to the agent user.

2. The communication system according to claim 1, wherein the call routing server retrieves the information from the memory portion based on properties of the telephone call using a matching process.

3. The communication system according to claim 2, wherein the matching process is performed by comparing the caller ID of the incoming telephone call with a primary client ID stored in the memory portion, the primary client ID associated with client information in the memory portion.

4. The communication system according to claim 2, wherein the matching process is performed by comparing a DID line number used by the incoming telephone call, the call routing server comparing the DID line number with information stored in the memory.

5. The communication system according to claim 1, further including an interface application, the interface application providing an interface between the phone switch and the computer telephone integration server.

6. The communication system according to claim 1, wherein the call routing server monitors the telephone call to the agent telephone and deflects the telephone call if the agent user does not answer the telephone call.

7. The communication system according to claim 6, wherein the client side further includes a plurality of phantom stations and a digital voice announcer, the digital voice announcer disposed on the computer telephone integration server;

the call routing server assigns a phantom station to the deflected telephone call, the phantom station establishing a conference call between the deflected call and an agent at a remote location, the call routing server also transferring the telephone call to the digital voice announcer, the digital voice announcer playing an audio message to the deflected telephone call prior to the call routing server returning the deflected telephone call to the phantom station.

8. The communication system according to claim 7, wherein the call routing server deflects the telephone call based on screening parameters.

9. The communication system according to claim 8, wherein the screening parameters is a list of persons, the call routing server determining if the telephone call is from a person on the list, and:

if the person is on the list, then the call routing server calls the agent to which the telephone call was directed at an agent forwarding number; and if the person is not on the list, then the call routing server forwards the telephone call to voicemail.

10. The communication system according to claim 9, wherein the agent forwarding number is a first agent forwarding number, and the call routing server calls a second agent forwarding number if the agent does not answer at the first agent forwarding number.

11. The communication system according to claim 10, wherein the first agent forwarding number and the second agent forwarding number are exchangeable by an agent using the agent application.

12. The communication system according to claim 10, wherein the first agent forwarding number and the second agent forwarding number are exchangeable by an attendant using the attendant application.

13. The communication system according to claim 1, wherein the telephone call is to a shared number calls selected for receipt by the attendant application are shared numbers at the organization, the shared numbers being numbers that are shared by a plurality of persons, and wherein the call routing server retrieves information from the memory portion regarding the shared numbers and forwards the information to the attendant application, the attendant application displays information regarding the shared numbers such that the attendant user may forward the telephone call to the agent.

14. The communication system according to claim 13, wherein the information is history regarding the persons who share the shared number.

15. The communication system according to claim 13, wherein the information is DID line information.

16. The communication system according to claim 1, wherein the attendant application provides an input for an attendant to enter caller information regarding the telephone call, the attendant application then providing an attendant with the ability to forward the caller information with the telephone call.

17. The communication system according to claim 16, wherein the attendant application provides an attendant with the ability to forward the caller information to the memory portion.

18. The communication system according to claim 1, wherein the computer telephone integration server includes an auto-attendant, the auto-attendant automatically processing the telephone call when an attendant user is not interfacing with the attendant application.

19. The communication system according to claim 18, wherein the auto-attendant allows a caller to select the voicemail of a particular agent.

20. The communication system according to claim 18, wherein the auto-attendant allows a caller to connect to a particular agent.

21. The communication system according to claim 1, further comprising a configuration application, the configuration application for providing a supervisor user with the capability to manage operating parameters of the agent application and the attendant application.

22. The communication system according to claim 21, wherein the configuration application is a web based application.

* * * * *

UNITED STATES PATENT AND TRADEMARK OFFICE
CERTIFICATE OF CORRECTION

PATENT NO. : 6,829,349 B1
DATED : December 7, 2004
INVENTOR(S) : Neale et al.

It is certified that error appears in the above-identified patent and that said Letters Patent is hereby corrected as shown below:

Column 6,
Line 7, delete "2F"
Line 11, "16" should be -- 116 --

Column 10,
Line 48, "venerated" should be -- generated --

Column 14,
Line 53, "S1112" should be -- S112 --
Lines 64 and 65, S1118" should -- S118 --

Signed and Sealed this

Fifteenth Day of March, 2005

JON W. DUDAS
*Director of the United States Patent and Trademark Office*